United States Patent
Long et al.

(10) Patent No.: US 12,401,526 B2
(45) Date of Patent: Aug. 26, 2025

(54) UPDATING DIGITAL CERTIFICATES ASSOCIATED WITH A VIRTUAL CLOUD NETWORK

(71) Applicant: Oracle International Corporation, Redwood Shores, CA (US)

(72) Inventors: Tony Long, Edmonds, WA (US); Sneha Sudhakaran Nair, Burnaby (CA); Burak Uzun, London (GB)

(73) Assignee: Oracle International Corporation, Redwood Shores, CA (US)

( * ) Notice: Subject to any disclaimer, the term of this patent is extended or adjusted under 35 U.S.C. 154(b) by 197 days.

(21) Appl. No.: 18/354,498

(22) Filed: Jul. 18, 2023

(65) Prior Publication Data
US 2025/0030561 A1 Jan. 23, 2025

(51) Int. Cl.
*H04L 29/06* (2006.01)
*H04L 9/30* (2006.01)
*H04L 9/32* (2006.01)

(52) U.S. Cl.
CPC .......... *H04L 9/3268* (2013.01); *H04L 9/3073* (2013.01); *H04L 9/3247* (2013.01); *H04L 9/3265* (2013.01)

(58) Field of Classification Search
None
See application file for complete search history.

(56) References Cited

U.S. PATENT DOCUMENTS

| 5,699,431 A | 12/1997 | Van Oorschot et al. |
| 7,272,714 B2 | 9/2007 | Nagaratnam et al. |
| 7,644,270 B1 | 1/2010 | Cherukumudi et al. |
| 8,452,958 B2 | 5/2013 | Sun et al. |

(Continued)

FOREIGN PATENT DOCUMENTS

| CN | 112019477 A | 12/2020 |
| CN | 114884963 A | 8/2022 |

(Continued)

OTHER PUBLICATIONS

"What is Certificate Lifecycle Management", Retrieved from https://www.encryptionconsulting.com/different-phases-of-a-certificate-lifecycle-management-process/, Aug. 1, 2024, pp. 1-12.

(Continued)

Primary Examiner — Jeffery L Williams
(74) Attorney, Agent, or Firm — Invoke

(57) ABSTRACT

Techniques for updating certificate bundles may include receiving, at an entity associated with a virtual cloud network, a certificate bundle that includes an updated set of certificate authority (CA) certificates. The techniques may include applying a validation process to an entity certificate based on the certificate bundle, with the entity certificate having been issued to the entity prior to the entity receiving the certificate bundle. The validation process may include validating, by the entity, a certificate chain that includes the entity certificate and a CA certificate included in the updated set of CA certificates. The techniques may include, responsive to validating the certificate chain, installing the certificate bundle in a storage medium associated with the entity, and utilizing, by the entity, the certificate bundle to authenticate at least one additional entity associated with the virtual cloud network.

72 Claims, 15 Drawing Sheets

(56) References Cited

U.S. PATENT DOCUMENTS

| | | | |
|---|---|---|---|
| 9,172,543 B2 | 10/2015 | Wnuk | |
| 9,197,630 B2 | 11/2015 | Sharif et al. | |
| 9,231,933 B1 | 1/2016 | Shenoy et al. | |
| 9,485,101 B2 | 11/2016 | Bowen | |
| 9,660,978 B1 | 5/2017 | Truskovsky et al. | |
| 9,680,813 B2 | 6/2017 | Sade et al. | |
| 9,794,249 B1 | 10/2017 | Truskovsky et al. | |
| 9,882,727 B1 | 1/2018 | Veladanda et al. | |
| 10,021,084 B2 | 7/2018 | Matthews et al. | |
| 10,212,147 B2 | 2/2019 | Buendgen et al. | |
| 10,652,030 B1 | 5/2020 | Levy et al. | |
| 10,764,263 B2 | 9/2020 | Rossi | |
| 10,771,261 B1 | 9/2020 | Lazar et al. | |
| 10,812,276 B2 | 10/2020 | Bojjireddy et al. | |
| 10,848,323 B2 | 11/2020 | Barr, III et al. | |
| 11,153,103 B2 | 10/2021 | Fynaardt et al. | |
| 11,196,570 B2 | 12/2021 | Borne-Pons et al. | |
| 11,310,059 B2 | 4/2022 | Leibmann et al. | |
| 11,362,843 B1 | 6/2022 | Jiang et al. | |
| 11,368,314 B2 | 6/2022 | Ray et al. | |
| 11,388,594 B2 | 7/2022 | Uy et al. | |
| 11,438,325 B2 | 9/2022 | Begun et al. | |
| 11,627,123 B2 | 4/2023 | Stayskal et al. | |
| 11,706,038 B1 | 7/2023 | Thakore et al. | |
| 11,888,997 B1 | 1/2024 | Bowen et al. | |
| 12,088,738 B2 | 9/2024 | Rosenthol et al. | |
| 2002/0007346 A1 | 1/2002 | Qiu et al. | |
| 2002/0174066 A1 | 11/2002 | Kleckner et al. | |
| 2003/0037234 A1 | 2/2003 | Fu et al. | |
| 2006/0047965 A1 | 3/2006 | Thayer | |
| 2006/0101510 A1 | 5/2006 | Kadyk et al. | |
| 2007/0005956 A1 | 1/2007 | Zilinskas et al. | |
| 2007/0147619 A1* | 6/2007 | Bellows | H04W 12/041 380/277 |
| 2010/0030897 A1* | 2/2010 | Stradling | G06F 21/572 709/225 |
| 2010/0325429 A1 | 12/2010 | Saha et al. | |
| 2011/0113239 A1 | 5/2011 | Fu et al. | |
| 2012/0036220 A1 | 2/2012 | Dare et al. | |
| 2012/0246466 A1 | 9/2012 | Salvarani et al. | |
| 2014/0298419 A1 | 10/2014 | Boubez et al. | |
| 2015/0135299 A1 | 5/2015 | Liang et al. | |
| 2017/0039373 A1 | 2/2017 | Sasin et al. | |
| 2017/0126667 A1* | 5/2017 | Bishop | H04L 9/3268 |
| 2017/0171191 A1 | 6/2017 | Cignetti et al. | |
| 2017/0317837 A1 | 11/2017 | Alrawais et al. | |
| 2017/0338967 A1 | 11/2017 | Lewison et al. | |
| 2018/0083966 A1 | 3/2018 | Zhou et al. | |
| 2018/0102904 A1 | 4/2018 | Lin et al. | |
| 2018/0287804 A1 | 10/2018 | Geisbush | |
| 2019/0149342 A1 | 5/2019 | Fynaardt et al. | |
| 2019/0165950 A1 | 5/2019 | Ibrahim | |
| 2019/0347406 A1 | 11/2019 | Lev-Ran | |
| 2019/0349402 A1 | 11/2019 | Shukla et al. | |
| 2019/0363895 A1 | 11/2019 | Barr et al. | |
| 2020/0021575 A1 | 1/2020 | Rezvani et al. | |
| 2020/0092095 A1* | 3/2020 | Yang | H04W 12/069 |
| 2020/0150972 A1 | 5/2020 | Ketkar et al. | |
| 2020/0274718 A1 | 8/2020 | Hwang et al. | |
| 2020/0274862 A1 | 8/2020 | Varvarezis et al. | |
| 2021/0126801 A1 | 4/2021 | Nix | |
| 2021/0152547 A1 | 5/2021 | Barhudarian et al. | |
| 2021/0211307 A1 | 7/2021 | Statia et al. | |
| 2021/0218723 A1 | 7/2021 | Lekov et al. | |
| 2021/0392002 A1 | 12/2021 | Gray et al. | |
| 2021/0409403 A1 | 12/2021 | Lewin et al. | |
| 2021/0409409 A1 | 12/2021 | Palanisamy | |
| 2022/0038894 A1* | 2/2022 | Yoon | H04W 12/069 |
| 2022/0123951 A1 | 4/2022 | Lutz et al. | |
| 2022/0150238 A1 | 5/2022 | Bhalerao | |
| 2022/0239503 A1* | 7/2022 | Mallikarjuna Durga Lokanath | H04L 9/0891 |
| 2022/0393886 A1 | 12/2022 | Williams et al. | |
| 2023/0032867 A1 | 2/2023 | Peddada et al. | |
| 2023/0109231 A1 | 4/2023 | Adogla et al. | |
| 2023/0208655 A1 | 6/2023 | Statia et al. | |
| 2023/0237155 A1 | 7/2023 | Jacquin et al. | |
| 2023/0291577 A1* | 9/2023 | Thai | H04L 9/3265 |
| 2023/0401307 A1* | 12/2023 | Pop | G06F 8/65 |
| 2023/0412397 A1* | 12/2023 | Gollent | H04L 9/007 |
| 2024/0015508 A1* | 1/2024 | Yoon | H04W 12/068 |
| 2024/0020373 A1* | 1/2024 | Ivanov | G06F 21/335 |
| 2024/0031146 A1 | 1/2024 | Marosi-Bauer et al. | |
| 2024/0106886 A1 | 3/2024 | Roy et al. | |
| 2024/0121603 A1* | 4/2024 | Yoon | H04W 12/069 |
| 2024/0146543 A1 | 5/2024 | Sahoo et al. | |
| 2024/0333640 A1* | 10/2024 | Shevade | H04L 45/44 |
| 2024/0356763 A1 | 10/2024 | Goldberg et al. | |
| 2024/0388510 A1* | 11/2024 | Madtha | H04L 41/342 |
| 2025/0030561 A1* | 1/2025 | Long | H04L 9/3268 |
| 2025/0088373 A1* | 3/2025 | Uzun | H04L 9/3268 |
| 2025/0097211 A1* | 3/2025 | Uzun | H04L 63/0823 |
| 2025/0133401 A1* | 4/2025 | Lee | H04W 8/183 |

FOREIGN PATENT DOCUMENTS

| | | | | |
|---|---|---|---|---|
| EP | 1251670 A2 | 10/2002 | | |
| EP | 2267970 A2 | 12/2010 | | |
| EP | 2854349 A1 | 4/2015 | | |
| EP | 3772208 B1 * | 9/2024 | | G06F 21/44 |
| KR | 10-2011-0045459 A | 5/2011 | | |
| WO | WO-2006122024 A2 * | 11/2006 | | H04N 21/4431 |
| WO | 2022/121461 A1 | 6/2022 | | |
| WO | 2022/133026 A1 | 6/2022 | | |
| WO | WO-2023240360 A1 * | 12/2023 | | H04L 9/006 |
| WO | WO-2025059187 A1 * | 3/2025 | | H04L 9/0825 |

OTHER PUBLICATIONS

"About Azure Key Vault certificates", Retrieved from https://learn.microsoft.com/en-us/azure/key-vault/certificates/about-certificates, Feb. 8, 2023, pp. 1-8.

"About the Expressway", Aug. 17, 2022. pp. 1-12.

"Automated certificate management for TLS certificates", Retrieved from https://docs.servicenow.com/en-US/bundle/utah-it-operations-management/page/product/discovery/concept/automated-cert-requests.html, Retrieved on May 4, 2023, pp. 1-4.

"AWS Certificate Manager FAQs", Retrieved from https://aws.amazon.com/certificate-manager/faqs/, Retrieved on Mar. 24, 2023, pp. 1-17.

"Azure Instance Metadata Service", Retrieved from https://learn.microsoft.com/en-us/azure/virtual-machines/instance-metadata-service?tabs=windows, Mar. 15, 2023, pp. 1-42.

"Cisco Expressway Certificate Creation and Use Deployment Guide", Feb. 23, 2021, pp. 10.

"Deploying the CA bundle iApp", Retrieved from https://www.f5.com/pdf/deployment-guides/f5-ca-bundle-dg.pdf, Dec. 14, 2017, pp. 1-9.

"DigiCert Public Key Infrastructure (PKI) Platform", 2019, pp. 15.

"Get started with Key Vault certificates", Retrieved from https://learn.microsoft.com/en-us/azure/key-vault/certificates/certificate-scenarios, Retrieved on Feb. 1, 2023, pp. 1-6.

"High Availability using Patching and Rolling AP Upgrade on Cisco Catalyst 9800 Wireless Controllers", Copyright 2020, pp. 1-41.

"Manage Certificate Revocation Lists (CRLs)", Jul. 23, 2021, pp. 1-4.

"PKI secrets engine", Retrieved from https://developer.hashicorp.com/vault/docs/secrets/pki, Retrieved on May 4, 2023, pp. 1-3.

"Planning a certificate revocation list (CRL)", Retrieved from https://docs.aws.amazon.com/privateca/latest/userguide/crl-planning.html, Retrieved on Jul. 28, 2023, pp. 11.

"Release app updates with staged rollouts", Retrieved from https://support.google.com/googleplay/android-developer/answer/6346149?hl=en#zippy=%2Crelease-a-staged-rollout-to-specific-countries, Retrieved on Apr. 27, 2023, pp. 1-2.

"Release Your App Update in a Staged Rollout", Retrieved from https://developer.amazon.com/docs/app-submission/release-updates-in-staged-rollouts.html, Retrieved on Apr. 27, 2023, pp. 1-18.

(56) References Cited

OTHER PUBLICATIONS

"Rotate Security Certificates", Retrieved from https://www.cockroachlabs.com/docs/stable/rotate-certificates, Retrieved on May 4, 2023, pp. 1-6.

"Rotating the Root CA and Leaf Certificates", Retrieved from https://docs.pivotal.io/ops-manager/2-4/security/pcf-infrastructure/rotate-cas-and-leaf-certs.html, Nov. 5, 2020, pp. 1-9.

"Staged upgrade", Retrieved from https://www.ibm.com/docs/en/order-management-sw/9.4.0?topic=migrating-staged-upgrade, Mar. 2, 2021, pp. 1-3.

"Troubleshoot SSL certificates", Retrieved from https://cloud.google.com/load-balancing/docs/ssl-certificates/troubleshooting, Retrieved on Mar. 24, 2023, pp. 1-8.

"Tutorial: Configure certificate auto-rotation in Key Vault", Retrieved from https://learn.microsoft.com/en-us/azure/key-vault/certificates/tutorial-rotate-certificates, Feb. 27, 2023, pp. 1-6.

"Updating the CA bundle", Retrieved from https://docs.openshift.com/container-platform/4.9/security/certificates/updating-ca-bundle.html#ca-bundle-understanding_updating-ca-bundle, Retrieved on Mar. 24, 2023, pp. 1-2.

"Updating your private CA", Retrieved from https://docs.aws.amazon.com/privateca/latest/userguide/PCAUpdateCA.html, Retrieved on Mar. 24, 2023, pp. 1-4.

"Use self-managed SSL certificates", Retrieved from https://cloud.google.com/load-balancing/docs/ssl-certificates/self-managed-certs, Aug. 15, 2023, pp. 13.

"VSphere Security", vmware, Update 3, Mar. 21, 2023, pp. 1-426.

"Working with Hosts", Retrieved from https://docs.cloudstack.apache.org/projects/archived-cloudstack-administration/en/latest/hosts.html, Retrieved on Mar. 24, 2023, pp. 1-7.

Atutxa et al., "Improving efficiency and security of IIoT communications using in-network validation of server certificate", Computers in Industry, vol. 144, Jan. 2023, 103802, pp. 30.

Bigelow S.J., "Rolling deployment", Retrieved from https://www.techtarget.com/searchitoperations/definition/rolling-deployment, Jan. 2023, pp. 4.

Este-Gracias S., "Rotate your CA seamlessly using a Vault PKI", Retrieved from https://sestegra.medium.com/rotate-your-ca-seamlessly-using-a-vault-pki-9262228b4afb Sep. 29, 2022, pp. 1-49.

Ghanmi et al., "A Secure Data Storage in Multi-cloud Architecture Using Blowfish Encryption Algorithm", Advanced Information Networking and Applications, Mar. 2022, pp. 398-408.

Jamal F., "Zero Trust for SSH—Secure One-click Server Access for Software Engineering Teams", Retrieved from https://www.banyansecurity.io/blog/zero-trust-for-ssh/, Oct. 28, 2020, pp. 1-7.

Manjusha R. et al., "Secure Authentication and Access System for Cloud Computing Auditing Services Using Associated Digital Certificate", Indian Journal of Science and Technology, vol. 8 (S7), Apr. 2015, pp. 220-227.

Nexthop Team, "Updated: Creating a Certificate Revocation List Distribution Point for Your Internal Certification Authority", Retrieved from https://techcommunity.microsoft.com/t5/skype-for-business-blog/updated-creating-a-certificate-revocation-list-distribution/ba-p/620691, Dec. 17, 2012, pp. 10.

Rowley J., "Google's Moving Forward Together Proposals for Root CA Policy: Rotating ICAS More Frequently", Retrieved from https://www.digicert.com/blog/googles-moving-forward-together-proposals-for-root-ca-policy, Mar. 22, 2023, pp. 1-11.

Subhayu, "Different Phases of a Certificate Lifecycle Management Process for a secure WPA2-Enterprise network", Certificate Lifecycle Management Oct. 6, 2022, pp. 16.

Ylonen et al., "Security of Automated Access Management Using Secure Shell (SSH)", NISTIR 7966 (Draft), Aug. 2014, pp. 43.

\* cited by examiner

UPDATING DIGITAL CERTIFICATES ASSOCIATED WITH A VIRTUAL CLOUD NETWORK

TECHNICAL FIELD

The present disclosure relates to digital certificates used by network entities to authenticate other network entities. In particular, the present disclosure relates to updating digital certificates and distributing updated digital certificates to network entities associated with a computer network.

BACKGROUND

A virtual cloud network includes network entities that communicate with one another. Communications between network entities may be performed in accordance with a security protocol whereby network entities authenticate one another by presenting a digital certificate. A digital certificate may be issued to a network entity by a certificate authority (CA). The digital certificate may include a digital signature of the CA that can be validated by other network entities using a public key of the CA that is made available to other network entities. When a network entity presents a valid digital certificate to another network entity, the other network entity can trust that it is communicating with the network entity, as opposed to some unknown entity, based on a trust relationship with the CA that issued the digital certificate.

The content of this background section should not be construed as prior art merely by virtue of its presence in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
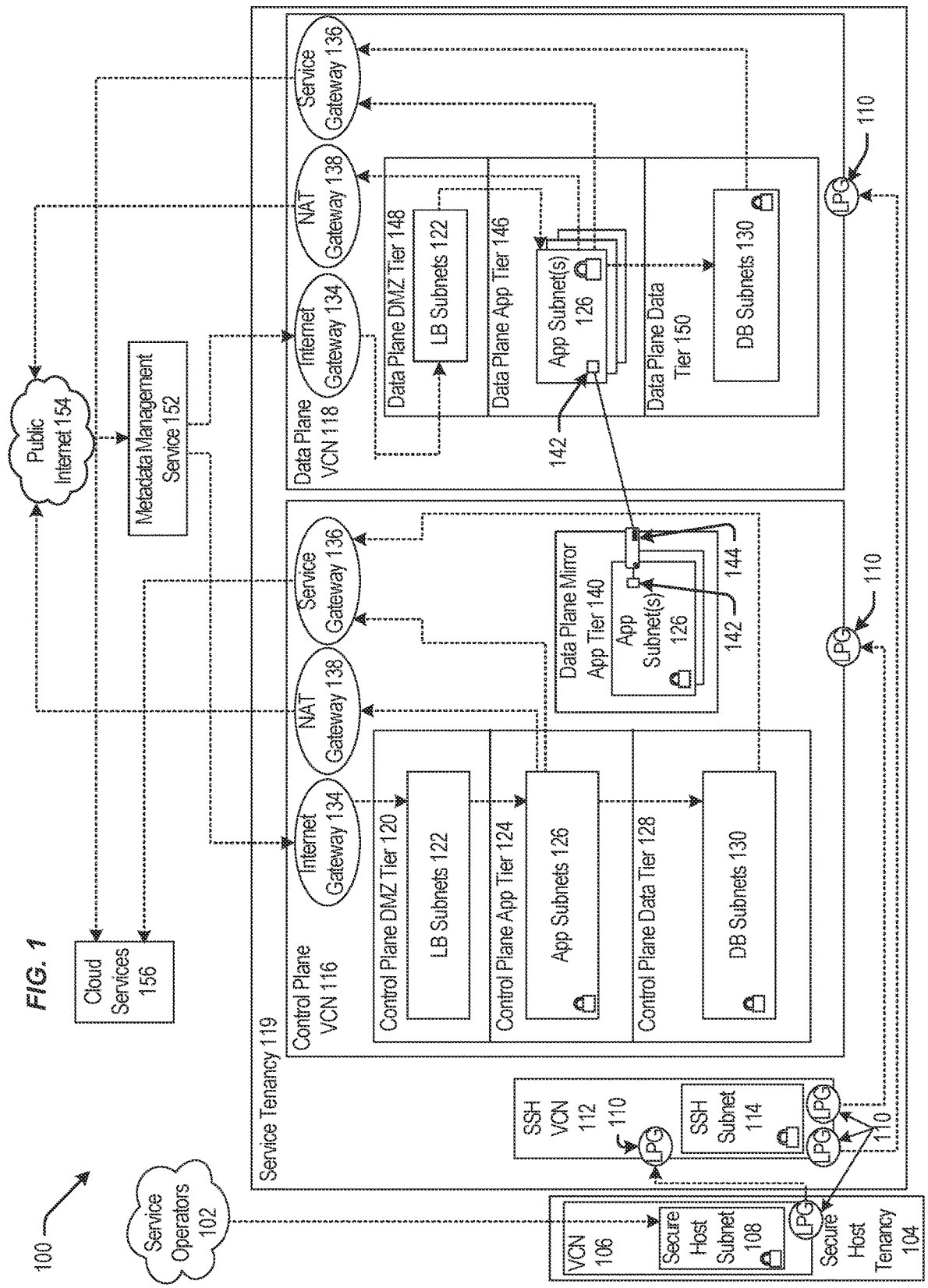
FIGS. 1-4 are block diagrams illustrating patterns for implementing a cloud infrastructure as a service system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. INTRODUCTION
2. GENERAL OVERVIEW
3. CLOUD COMPUTING TECHNOLOGY
4. COMPUTER SYSTEM
5. ARCHITECTURAL OVERVIEW
6. AUTHENTICATING NETWORK ENTITIES
7. UPDATING CERTIFICATE AUTHORITY CERTIFICATES
8. DISTRIBUTING CERTIFICATE BUNDLES
   A. Distribution operation timelines
   B. Distribution operation processes
9. MISCELLANEOUS; EXTENSIONS

1. Introduction

A system generates and distributes certificate bundles to network entities associated with a virtual cloud network. The certificate bundles may include a set of CA certificates that may be utilized by the network entities to authenticate other network entities associated with the virtual cloud network. The CA certificates in the certificate bundle include various CAs that have issued entity certificates to various network entities associated with the virtual cloud network. When a network entity presents an entity certificate to another entity, the other entity may authenticate the entity certificate by obtaining a public key from a certificate bundle that corresponds to the CA that issued the entity certificate, and using the public key corresponding to the CA to decrypt the digital signature on the entity certificate.

2. General Overview

One or more embodiments apply a validation process for validating an updated set of CA certificates prior to relying on the updated set of CA certificates to authenticate other network entities. The validation process may be referred to herein as a self-validation process because the process involves an entity validating it's own entity certificate.

A system distributes an updated certificate bundle that includes an updated set of CA certificates to a set of network entities. When a particular network entity receives an updated certificate bundle, the network entity may validate the updated certificate bundle by applying a self-validation process to that particular network entity's own, current entity certificate based on the updated certificate bundle. The entity certificate, used in the validation process by the particular network entity, is an entity certificate that was issued to the particular network entity prior to the particular network entity receiving the updated certificate bundle. If the self-validation process is successful, the particular network entity accepts the updated certificate bundle and begins utilizing the updated set of CA certificates in the updated certificate bundle for authenticating other network entities. If the self-validation process is unsuccessful, the particular network entity rejects the updated certificate bundle and refrains from utilizing the updated set of CA certificates in the updated certificate for validating other network entities. Instead, upon having rejected the updated certificate bundle, the particular network entity may authenticate other network entities using CA certificates in a current certificate bundle that is (a) currently being used for authenticating other network entities and (b) was distributed to the particular network entity prior to the updated certificate bundle.

A particular network entity may determine that the self-validation process is successful when (a) the updated certificate bundle includes a CA certificate that was used to sign the particular network entity's own entity certificate, or (b) a certificate chain, beginning with the particular network entity's own certificate and ending with a CA certificate included in the updated certificate bundle, is validated by the network entity. The term "certificate chain," as used herein, includes a sequence of digital certificates having a hierarchy starting from an entity certificate and ending with a top-level, root CA certificate, in which each digital certificates in the sequence is issued by a CA identified in the next digital certificate in the hierarchy with the exception of the root CA certificate, which is self-issued by a CA identified in the root CA certificate.

In one example, a certificate chain may be validated by (a) matching a public key of a signing CA certificate, that was used by a CA to sign a current certificate, to a digital signature of the CA on the current certificate, and (b) repeating the matching operation using the signing CA certificate as the current certificate, until the digital signature of each current certificate has been matched to the public key of the signing CA certificate. A number of intermediate CA certificates may be included in a certificate chain between the particular network entity's own entity certificate and a root CA certificate at the end of the certificate chain included in the updated set of CA certificates.

In one example, a particular network entity may determine that the self-validation process is unsuccessful when (a) the particular network entity's own entity certificate has not been signed using any CA certificate included in the updated set of CA certificates, and (b) a certificate chain, beginning with the particular network entity's own certificate, does not includes any CA certificate included in the updated set of CA certificates. Additionally, or in the alternative, a particular network entity may determine that the self-validation process is unsuccessful when any certificate in the certificate chain beginning with the particular network entity's own entity certificate is unvalidated. For example, a certificate may be invalidated if a CA's digital signature on the certificate does not match the CA's public key.

In order to transition a set of network entities from a current, first set of CA certificates to an updated, second set of CA certificates, one or more embodiments first distribute an intermediate certificate bundle that includes an updated set of CA certificates, followed by a second certificate bundle. The updated set of CA certificates in the intermediate certificate bundle includes a first subset of CA certificates that are still being used by the network entities and a second subset of new CA certificates that are intended to be used by the network entities going forward. While the current, first certificate bundle is being used by network entities to authenticate other network entities, the system distributes the intermediate certificate bundle to the network entities. A particular network entity accepts the intermediate certificate bundle upon having validated its current entity certificate based at least in part on a CA certificate in the intermediate certificate bundle. Thereafter, the system provides a new entity certificate to the particular network entity that replaces the particular network entity's current entity certificate. The particular network entity's new entity certificate is signed (directly or indirectly via a certificate chain) by a CA corresponding to a CA certificate that is included in the updated set of CA certificates in the intermediate certificate bundle. The system thereafter distributes the second certificate bundle that (a) includes the subset of new CA certificates from the intermediate certificate bundle, and (b) does not include at least one CA certificate from the first subset of CA certificates that was included in the intermediate certificate bundle. The particular network entity accepts the second certificate bundle upon having validated its new entity certificate based at least in part on a CA certificate included in the second certificate bundle using the validation process described herein (validation based on CA certificate being in certificate bundle, or validation by confirming the validity of a certificate chain).

One or more embodiments provide improvements to technology associated with distribution of new CA certificates utilized in virtual cloud networks. In one improvement to this technology, the presently disclosed techniques obviate the need for downtime when updating CA certificates. Downtime is avoided by a certificate bundle distribution procedure that, amongst other things, ensures by design that a root certificate in each certificate bundle being distributed to a set of network entities corresponds to each entity certificate of each network entity, and further by a validation process that ensures in actuality that the above certificate bundle distribution procedure is being adhered to. If at any time, an entity certificate of a network entity is issued by a CA certificate that is not in a certificate bundle being installed on a set of network entities, then such network entity would be unable to perform the requisite authentication procedures to establish communications with other network entities, and potentially widespread downtime may result throughout the virtual cloud network. By performing the validation processes on updated certificate bundles as described herein, a network entity confirms that other entities will be able to authenticate the network entity using the updated certificate bundle when the network entity presents its entity certificate for authentication. Likewise, the other network entities that validate the updated certificate bundle confirm that the network entity will be able to authenticate them using the updated certificate bundle when they present their entity certificate for authentication. As a result, potential issues that are unique to a particular network entity may be identified during the validation process prior to removing earlier CA certificates.

Downtime is avoided with respect to distribution of the intermediate certificate bundle (which includes the new CA certificates along with the earlier CA certificates) because the network entity performs a first self-validation process prior to installing the intermediate certificate bundle. This first self-validation process assures that, when the intermediate certificate bundle is installed, the earlier CA certificate of the CA that issued the network entity's earlier entity certificate can continue to be successfully used by other entities to authenticate the network entity's entity certificate. Further, downtime is avoided with respect to the distribution of the second certificate bundle (which includes the new CA certificates with the earlier CA certificates having been removed) because the network entity performs a second self-validation process prior to installing the second certificate bundle. This second self-validation process assures that, when the second certificate bundle is installed, the new CA certificate of the CA that issues the network entity's new entity certificate can be successfully used by other entities to authenticate the network entity's new entity certificate. Additionally, in contrast with the presently disclosed techniques, distributing certificate bundles that include only the new CA certificates may cause downtime until all of the network entities are finally updated. Further, incorporation of CA certificates into an operating system (OS) image generally requires downtime when transitioning from an earlier OS image to a new OS image that includes new CA certificates. Downtime associated with transitioning between OS images is avoided by utilizing updated certificate bundles to distribute new CA certificates.

Additionally, one or more embodiments improve virtual cloud network provisioning technology. For example, the distribution of updated certificate bundles is more expedient than generating an updated OS image, utilizes fewer computing resources than generating an updated OS image, and avoids downtime associated with transitioning to an updated OS image. When provisioning a region of a virtual cloud network, CA certificates may be updated multiple times during the provisioning process, for example, in accordance with security protocols that call for updating CA certificates. Consequently, with these security protocols, it may be impractical to incorporate CA certificates into OS images and sequentially generate updated OS images with each CA certificate update. For example, the time that would be consumed by generating updated OS images for each updated set of CA certificates may exceed the time constraints for provisioning the virtual cloud network. Accordingly, by distributing new CA certificates in updated certificate bundles as described herein, the new CA certificates are distributed more expediently while also ensuring that there is zero downtime.

One or more embodiments described in this Specification and/or recited in the claims may not be included in this General Overview section.

3. Cloud Computing Technology

Infrastructure as a Service (IaaS) is an application of cloud computing technology. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In some cases, a cloud computing model will involve the participation of a cloud provider. The cloud provider may, but need not be, a third-party service that specializes in providing (e.g., offering, renting, selling) IaaS. An entity may also opt to deploy a private cloud, becoming its own provider of infrastructure services.

In some examples, IaaS deployment is the process of implementing a new application, or a new version of an application, onto a prepared application server or other similar device. IaaS deployment may also include the process of preparing the server (e.g., installing libraries, daemons, etc.). The deployment process is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are challenges for IaaS provisioning. There is an initial challenge of provisioning the initial set of infrastructure. There is an additional challenge of evolving the existing infrastructure (e.g., adding new services, changing services, removing services, etc.) after the initial provisioning is completed. In some cases, these challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). In some embodiments, infrastructure and resources may be provisioned (manually, and/or using a provisioning tool) prior to deployment of code to be executed on the infrastructure. However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

FIG. 1 is a block diagram illustrating an example pattern of an IaaS architecture 100, according to at least one embodiment. Service operators 102 can be communicatively coupled to a secure host tenancy 104 that can include a virtual cloud network (VCN) 106 and a secure host subnet 108. In some examples, the service operators 102 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 106 and/or the Internet.

The VCN 106 can include a local peering gateway (LPG) 110 that can be communicatively coupled to a secure shell (SSH) VCN 112 via an LPG 110 contained in the SSH VCN 112. The SSH VCN 112 can include an SSH subnet 114, and the SSH VCN 112 can be communicatively coupled to a control plane VCN 116 via the LPG 110 contained in the control plane VCN 116. Also, the SSH VCN 112 can be communicatively coupled to a data plane VCN 118 via an LPG 110. The control plane VCN 116 and the data plane VCN 118 can be contained in a service tenancy 119 that can be owned and/or operated by the IaaS provider.

The control plane VCN 116 can include a control plane demilitarized zone (DMZ) tier 120 that acts as a perimeter network (e.g., portions of a corporate network between the corporate intranet and external networks). The DMZ-based servers may have restricted responsibilities and help keep breaches contained. Additionally, the DMZ tier 120 can include one or more load balancer (LB) subnet(s) 122, a control plane app tier 124 that can include app subnet(s) 126, a control plane data tier 128 that can include database (DB) subnet(s) 130 (e.g., frontend DB subnet(s) and/or backend DB subnet(s)). The LB subnet(s) 122 contained in the control plane DMZ tier 120 can be communicatively coupled to the app subnet(s) 126 contained in the control plane app tier 124 and an Internet gateway 134 that can be contained in the control plane VCN 116, and the app subnet(s) 126 can be communicatively coupled to the DB subnet(s) 130 contained in the control plane data tier 128 and a service gateway 136 and a network address translation (NAT) gateway 138. The control plane VCN 116 can include the service gateway 136 and the NAT gateway 138.

The control plane VCN 116 can include a data plane mirror app tier 140 that can include app subnet(s) 126. The app subnet(s) 126 contained in the data plane mirror app tier 140 can include a virtual network interface controller (VNIC) 142 that can execute a compute instance 144. The compute instance 144 can communicatively couple the app subnet(s) 126 of the data plane mirror app tier 140 to app subnet(s) 126 that can be contained in a data plane app tier 146.

The data plane VCN 118 can include the data plane app tier 146, a data plane DMZ tier 148, and a data plane data tier 150. The data plane DMZ tier 148 can include LB subnet(s) 122 that can be communicatively coupled to the app subnet(s) 126 of the data plane app tier 146 and the Internet gateway 134 of the data plane VCN 118. The app subnet(s) 126 can be communicatively coupled to the service gateway 136 of the data plane VCN 118 and the NAT gateway 138 of the data plane VCN 118. The data plane data tier 150 can also include the DB subnet(s) 130 that can be communicatively coupled to the app subnet(s) 126 of the data plane app tier 146.

The Internet gateway 134 of the control plane VCN 116 and of the data plane VCN 118 can be communicatively coupled to a metadata management service 152 that can be communicatively coupled to public Internet 154. Public Internet 154 can be communicatively coupled to the NAT gateway 138 of the control plane VCN 116 and of the data plane VCN 118. The service gateway 136 of the control plane VCN 116 and of the data plane VCN 118 can be communicatively couple to cloud services 156.

In some examples, the service gateway 136 of the control plane VCN 116 or of the data plane VCN 118 can make application programming interface (API) calls to cloud services 156 without going through public Internet 154. The API calls to cloud services 156 from the service gateway 136 can be one-way: the service gateway 136 can make API calls to cloud services 156, and cloud services 156 can send requested data to the service gateway 136. But, cloud services 156 may not initiate API calls to the service gateway 136.

In some examples, the secure host tenancy 104 can be directly connected to the service tenancy 119, which may be otherwise isolated. The secure host subnet 108 can communicate with the SSH subnet 114 through an LPG 110 that may enable two-way communication over an otherwise isolated system. Connecting the secure host subnet 108 to the SSH subnet 114 may give the secure host subnet 108 access to other entities within the service tenancy 119.

The control plane VCN 116 may allow users of the service tenancy 119 to set up or otherwise provision desired resources. Desired resources provisioned in the control plane VCN 116 may be deployed or otherwise used in the data plane VCN 118. In some examples, the control plane VCN 116 can be isolated from the data plane VCN 118, and the data plane mirror app tier 140 of the control plane VCN 116 can communicate with the data plane app tier 146 of the data plane VCN 118 via VNICs 142 that can be contained in the data plane mirror app tier 140 and the data plane app tier 146.

In some examples, users of the system, or customers, can make requests, for example create, read, update, or delete (CRUD) operations, through public Internet 154 that can communicate the requests to the metadata management service 152. The metadata management service 152 can communicate the request to the control plane VCN 116 through the Internet gateway 134. The request can be received by the LB subnet(s) 122 contained in the control plane DMZ tier 120. The LB subnet(s) 122 may determine that the request is valid, and in response to this determination, the LB subnet(s) 122 can transmit the request to app subnet(s) 126 contained in the control plane app tier 124. If the request is validated and requires a call to public Internet 154, the call to public Internet 154 may be transmitted to the NAT gateway 138 that can make the call to public Internet 154. Metadata that may be desired to be stored by the request can be stored in the DB subnet(s) 130.

In some examples, the data plane mirror app tier 140 can facilitate direct communication between the control plane VCN 116 and the data plane VCN 118. For example, changes, updates, or other suitable modifications to configuration may be desired to be applied to the resources contained in the data plane VCN 118. Via a VNIC 142, the control plane VCN 116 can directly communicate with, and can thereby execute the changes, updates, or other suitable modifications to configuration to, resources contained in the data plane VCN 118.

In some embodiments, the control plane VCN 116 and the data plane VCN 118 can be contained in the service tenancy 119. In this case, the user, or the customer, of the system may not own or operate either the control plane VCN 116 or the data plane VCN 118. Instead, the IaaS provider may own or operate the control plane VCN 116 and the data plane VCN 118, both of which may be contained in the service tenancy 119. This embodiment can enable isolation of networks that may prevent users or customers from interacting with other users', or other customers', resources. Also, this embodiment may allow users or customers of the system to store databases privately without needing to rely on public Internet 154, which may not have a desired level of threat prevention, for storage.

In other embodiments, the LB subnet(s) 122 contained in the control plane VCN 116 can be configured to receive a signal from the service gateway 136. In this embodiment, the control plane VCN 116 and the data plane VCN 118 may be configured to be called by a customer of the IaaS provider without calling public Internet 154. Customers of the IaaS provider may desire this embodiment since database(s) that the customers use may be controlled by the IaaS provider and may be stored on the service tenancy 119, which may be isolated from public Internet 154.

Figure 2:
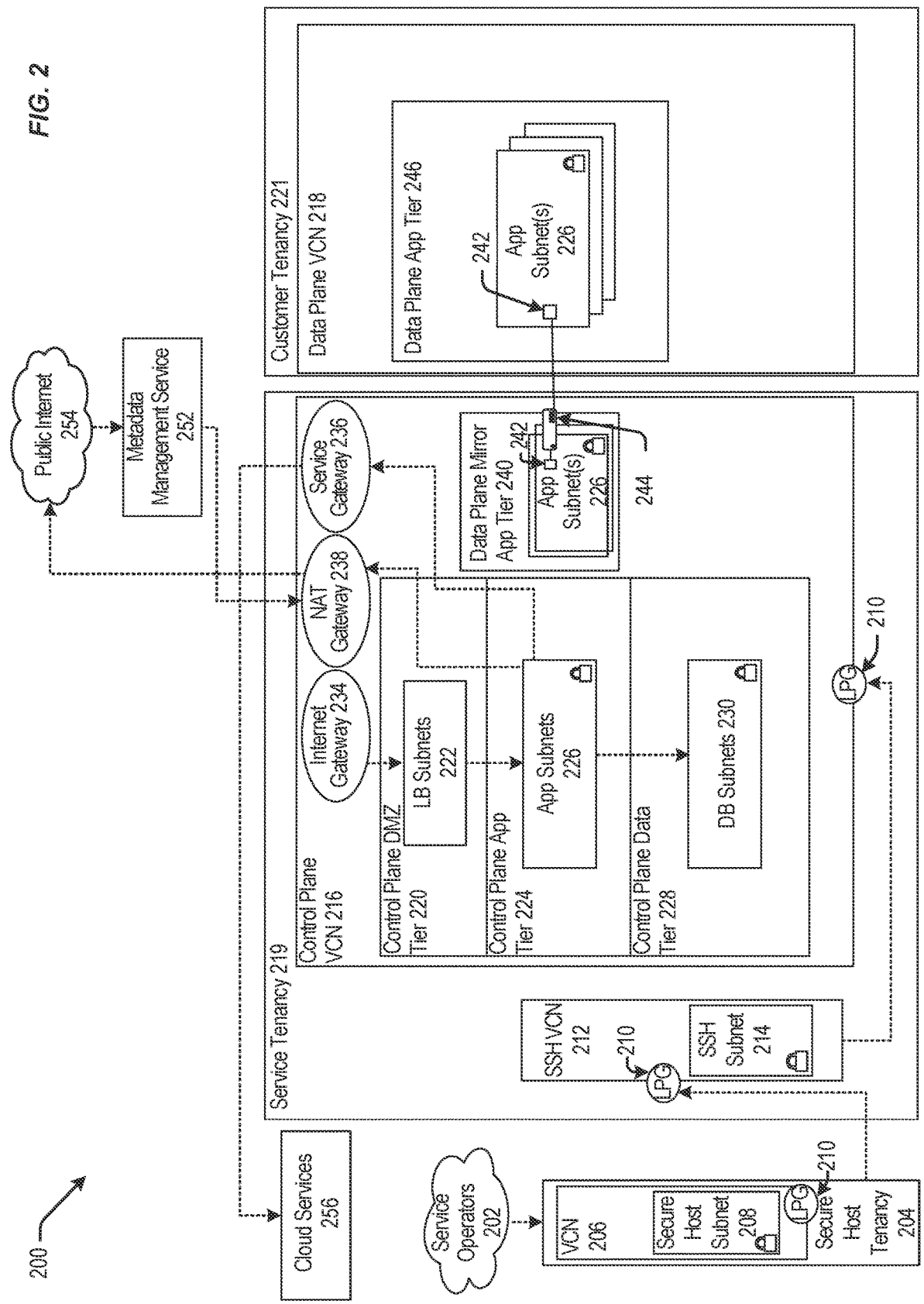

FIG. 2 is a block diagram illustrating another example pattern of an IaaS architecture 200, according to at least one embodiment. Service operators 202 (e.g., service operators 102 of FIG. 1) can be communicatively coupled to a secure host tenancy 204 (e.g., the secure host tenancy 104 of FIG. 1) that can include a virtual cloud network (VCN) 206 (e.g., the VCN 106 of FIG. 1) and a secure host subnet 208 (e.g., the secure host subnet 108 of FIG. 1). The VCN 206 can include a local peering gateway (LPG) 210 (e.g., the LPG 110 of FIG. 1) that can be communicatively coupled to a secure shell (SSH) VCN 212 (e.g., the SSH VCN 112 of FIG. 1) via an LPG 110 contained in the SSH VCN 212. The SSH VCN 212 can include an SSH subnet 214 (e.g., the SSH subnet 114 of FIG. 1), and the SSH VCN 212 can be communicatively coupled to a control plane VCN 216 (e.g., the control plane VCN 116 of FIG. 1) via an LPG 210 contained in the control plane VCN 216. The control plane VCN 216 can be contained in a service tenancy 219 (e.g., the service tenancy 119 of FIG. 1), and the data plane VCN 218 (e.g., the data plane VCN 118 of FIG. 1) can be contained in a customer tenancy 221 that may be owned or operated by users, or customers, of the system.

The control plane VCN 216 can include a control plane DMZ tier 220 (e.g., the control plane DMZ tier 120 of FIG. 1) that can include LB subnet(s) 222 (e.g., LB subnet(s) 122 of FIG. 1), a control plane app tier 224 (e.g., the control plane app tier 124 of FIG. 1) that can include app subnet(s) 226 (e.g., app subnet(s) 126 of FIG. 1), a control plane data tier 228 (e.g., the control plane data tier 128 of FIG. 1) that can include database (DB) subnet(s) 230 (e.g., similar to DB subnet(s) 130 of FIG. 1). The LB subnet(s) 222 contained in the control plane DMZ tier 220 can be communicatively coupled to the app subnet(s) 226 contained in the control plane app tier 224 and an Internet gateway 234 (e.g., the Internet gateway 134 of FIG. 1) that can be contained in the control plane VCN 216, and the app subnet(s) 226 can be communicatively coupled to the DB subnet(s) 230 contained in the control plane data tier 228 and a service gateway 236 (e.g., the service gateway 136 of FIG. 1) and a network address translation (NAT) gateway 238 (e.g., the NAT gateway 138 of FIG. 1). The control plane VCN 216 can include the service gateway 236 and the NAT gateway 238.

The control plane VCN 216 can include a data plane mirror app tier 240 (e.g., the data plane mirror app tier 140 of FIG. 1) that can include app subnet(s) 226. The app subnet(s) 226 contained in the data plane mirror app tier 240 can include a virtual network interface controller (VNIC) 242 (e.g., the VNIC of 142) that can execute a compute instance 244 (e.g., similar to the compute instance 144 of FIG. 1). The compute instance 244 can facilitate communication between the app subnet(s) 226 of the data plane mirror app tier 240 and the app subnet(s) 226 that can be contained in a data plane app tier 246 (e.g., the data plane app tier 146 of FIG. 1) via the VNIC 242 contained in the data plane mirror app tier 240 and the VNIC 242 contained in the data plane app tier 246.

The Internet gateway 234 contained in the control plane VCN 216 can be communicatively coupled to a metadata management service 252 (e.g., the metadata management service 152 of FIG. 1) that can be communicatively coupled to public Internet 254 (e.g., public Internet 154 of FIG. 1). Public Internet 254 can be communicatively coupled to the NAT gateway 238 contained in the control plane VCN 216. The service gateway 236 contained in the control plane VCN 216 can be communicatively couple to cloud services 256 (e.g., cloud services 156 of FIG. 1).

In some examples, the data plane VCN 218 can be contained in the customer tenancy 221. In this case, the IaaS provider may provide the control plane VCN 216 for each customer, and the IaaS provider may, for each customer, set up a unique, compute instance 244 that is contained in the service tenancy 219. Each compute instance 244 may allow communication between the control plane VCN 216, contained in the service tenancy 219, and the data plane VCN 218 that is contained in the customer tenancy 221. The compute instance 244 may allow resources, that are provisioned in the control plane VCN 216 that is contained in the service tenancy 219, to be deployed or otherwise used in the data plane VCN 218 that is contained in the customer tenancy 221.

In other examples, the customer of the IaaS provider may have databases that live in the customer tenancy 221. In this example, the control plane VCN 216 can include the data plane mirror app tier 240 that can include app subnet(s) 226. The data plane mirror app tier 240 can reside in the data plane VCN 218, but the data plane mirror app tier 240 may not live in the data plane VCN 218. That is, the data plane mirror app tier 240 may have access to the customer tenancy 221, but the data plane mirror app tier 240 may not exist in the data plane VCN 218 or be owned or operated by the customer of the IaaS provider. The data plane mirror app tier 240 may be configured to make calls to the data plane VCN 218 but may not be configured to make calls to any entity contained in the control plane VCN 216. The customer may desire to deploy or otherwise use resources in the data plane VCN 218 that are provisioned in the control plane VCN 216, and the data plane mirror app tier 240 can facilitate the desired deployment, or other usage of resources, of the customer.

In some embodiments, the customer of the IaaS provider can apply filters to the data plane VCN 218. In this embodiment, the customer can determine what the data plane VCN 218 can access, and the customer may restrict access to public Internet 254 from the data plane VCN 218. The IaaS provider may not be able to apply filters or otherwise control access of the data plane VCN 218 to any outside networks or databases. Applying filters and controls by the customer onto the data plane VCN 218, contained in the customer tenancy 221, can help isolate the data plane VCN 218 from other customers and from public Internet 254.

In some embodiments, cloud services 256 can be called by the service gateway 236 to access services that may not exist on public Internet 254, on the control plane VCN 216, or on the data plane VCN 218. The connection between cloud services 256 and the control plane VCN 216 or the data plane VCN 218 may not be live or continuous. Cloud services 256 may exist on a different network owned or operated by the IaaS provider. Cloud services 256 may be configured to receive calls from the service gateway 236 and may be configured to not receive calls from public Internet 254. Some cloud services 256 may be isolated from other cloud services 256, and the control plane VCN 216 may be isolated from cloud services 256 that may not be in the same region as the control plane VCN 216. For example, the control plane VCN 216 may be located in "Region 1," and cloud service "Deployment 1," may be located in Region 1 and in "Region 2." If a call to Deployment 1 is made by the service gateway 236 contained in the control plane VCN 216 located in Region 1, the call may be transmitted to Deployment 1 in Region 1. In this example, the control plane VCN 216, or Deployment 1 in Region 1, may not be communicatively coupled to, or otherwise in communication with, Deployment 1 in Region 2.

Figure 3:
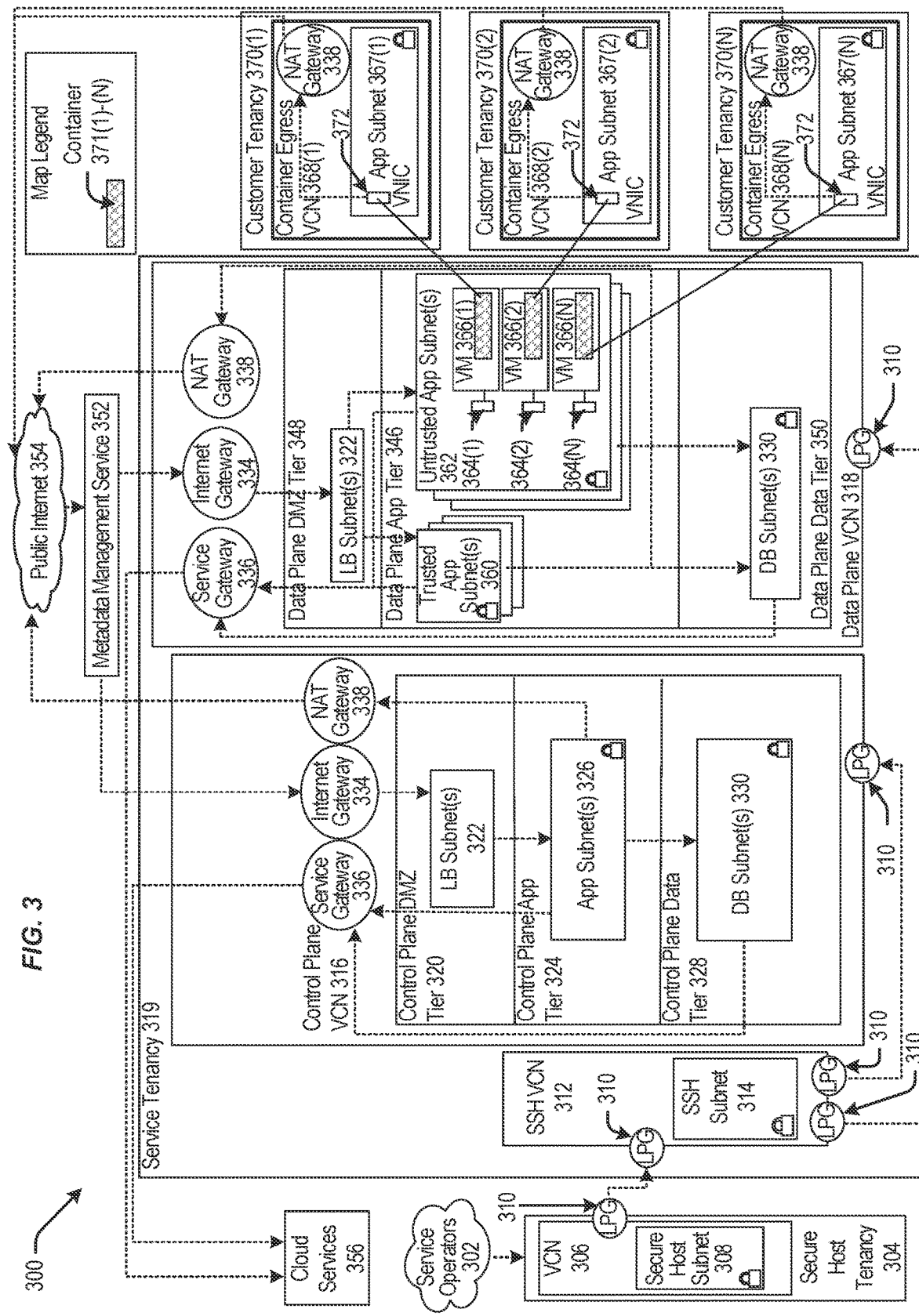

FIG. 3 is a block diagram illustrating another example pattern of an IaaS architecture 300, according to at least one embodiment. Service operators 302 (e.g., service operators 102 of FIG. 1) can be communicatively coupled to a secure host tenancy 304 (e.g., the secure host tenancy 104 of FIG. 1) that can include a virtual cloud network (VCN) 306 (e.g., the VCN 106 of FIG. 1) and a secure host subnet 308 (e.g., the secure host subnet 108 of FIG. 1). The VCN 306 can include an LPG 310 (e.g., the LPG 110 of FIG. 1) that can be communicatively coupled to an SSH VCN 312 (e.g., the SSH VCN 112 of FIG. 1) via an LPG 310 contained in the SSH VCN 312. The SSH VCN 312 can include an SSH subnet 314 (e.g., the SSH subnet 114 of FIG. 1), and the SSH VCN 312 can be communicatively coupled to a control plane VCN 316 (e.g., the control plane VCN 116 of FIG. 1) via an LPG 310 contained in the control plane VCN 316 and to a data plane VCN 318 (e.g., the data plane VCN 118 of FIG. 1) via an LPG 310 contained in the data plane VCN 318. The control plane VCN 316 and the data plane VCN 318 can be contained in a service tenancy 319 (e.g., the service tenancy 119 of FIG. 1).

The control plane VCN 316 can include a control plane DMZ tier 320 (e.g., the control plane DMZ tier 120 of FIG. 1) that can include load balancer (LB) subnet(s) 322 (e.g., LB subnet(s) 122 of FIG. 1), a control plane app tier 324 (e.g., the control plane app tier 124 of FIG. 1) that can include app subnet(s) 326 (e.g., similar to app subnet(s) 126 of FIG. 1), a control plane data tier 328 (e.g., the control plane data tier 128 of FIG. 1) that can include DB subnet(s) 330. The LB subnet(s) 322 contained in the control plane DMZ tier 320 can be communicatively coupled to the app subnet(s) 326 contained in the control plane app tier 324 and to an Internet gateway 334 (e.g., the Internet gateway 134 of FIG. 1) that can be contained in the control plane VCN 316, and the app subnet(s) 326 can be communicatively coupled to the DB subnet(s) 330 contained in the control plane data tier 328 and to a service gateway 336 (e.g., the service gateway of FIG. 1) and a network address translation (NAT) gateway 338 (e.g., the NAT gateway 138 of FIG. 1). The control plane VCN 316 can include the service gateway 336 and the NAT gateway 338.

The data plane VCN 318 can include a data plane app tier 346 (e.g., the data plane app tier 146 of FIG. 1), a data plane DMZ tier 348 (e.g., the data plane DMZ tier 148 of FIG. 1), and a data plane data tier 350 (e.g., the data plane data tier 150 of FIG. 1). The data plane DMZ tier 348 can include LB subnet(s) 322 that can be communicatively coupled to trusted app subnet(s) 360 and untrusted app subnet(s) 362 of the data plane app tier 346 and the Internet gateway 334 contained in the data plane VCN 318. The trusted app subnet(s) 360 can be communicatively coupled to the service gateway 336 contained in the data plane VCN 318, the NAT gateway 338 contained in the data plane VCN 318, and DB subnet(s) 330 contained in the data plane data tier 350. The untrusted app subnet(s) 362 can be communicatively coupled to the service gateway 336 contained in the data plane VCN 318 and DB subnet(s) 330 contained in the data plane data tier 350. The data plane data tier 350 can include DB subnet(s) 330 that can be communicatively coupled to the service gateway 336 contained in the data plane VCN 318.

The untrusted app subnet(s) 362 can include one or more primary VNICs 364(1)-(N) that can be communicatively coupled to tenant virtual machines (VMs) 366(1)-(N). Each tenant VM 366(1)-(N) can be communicatively coupled to a respective app subnet 367(1)-(N) that can be contained in respective container egress VCNs 368(1)-(N) that can be contained in respective customer tenancies 370(1)-(N). Respective secondary VNICs 372(1)-(N) can facilitate communication between the untrusted app subnet(s) 362 contained in the data plane VCN 318 and the app subnet contained in the container egress VCNs 368(1)-(N). Each container egress VCNs 368(1)-(N) can include a NAT gateway 338 that can be communicatively coupled to public Internet 354 (e.g., public Internet 154 of FIG. 1).

The Internet gateway 334 contained in the control plane VCN 316 and contained in the data plane VCN 318 can be communicatively coupled to a metadata management service 352 (e.g., the metadata management service 152 of FIG. 1) that can be communicatively coupled to public Internet 354. Public Internet 354 can be communicatively coupled to the NAT gateway 338 contained in the control plane VCN 316 and contained in the data plane VCN 318. The service gateway 336 contained in the control plane VCN 316 and contained in the data plane VCN 318 can be communicatively couple to cloud services 356.

In some embodiments, the data plane VCN 318 can be integrated with customer tenancies 370. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 346. Code to run the function may be executed in the VMs 366(1)-(N), and the code may not be configured to run anywhere else on the data plane VCN 318. Each VM 366(1)-(N) may be connected to one customer tenancy 370. Respective containers 371(1)-(N) contained in the VMs 366(1)-(N) may be configured to run the code. In this case, there can be a dual isolation (e.g., the containers 371(1)-(N) running code, where the containers 371(1)-(N) may be contained in at least the VM 366(1)-(N) that are contained in the untrusted app subnet(s) 362), which may help prevent incorrect or otherwise undesirable code from damaging the network of the IaaS provider or from damaging a network of a different customer. The containers 371(1)-(N) may be communicatively coupled to the customer tenancy 370 and may be configured to transmit or receive data from the customer tenancy 370. The containers 371(1)-(N) may not be configured to transmit or receive data from any other entity in the data plane VCN 318. Upon completion of running the code, the IaaS provider may kill or otherwise dispose of the containers 371(1)-(N).

In some embodiments, the trusted app subnet(s) 360 may run code that may be owned or operated by the IaaS provider. In this embodiment, the trusted app subnet(s) 360 may be communicatively coupled to the DB subnet(s) 330 and be configured to execute CRUD operations in the DB subnet(s) 330. The untrusted app subnet(s) 362 may be communicatively coupled to the DB subnet(s) 330, but in this embodiment, the untrusted app subnet(s) may be configured to execute read operations in the DB subnet(s) 330. The containers 371(1)-(N) that can be contained in the VM 366(1)-(N) of each customer and that may run code from the customer may not be communicatively coupled with the DB subnet(s) 330.

In other embodiments, the control plane VCN 316 and the data plane VCN 318 may not be directly communicatively coupled. In this embodiment, there may be no direct communication between the control plane VCN 316 and the data plane VCN 318. However, communication can occur indirectly through at least one method. An LPG 310 may be established by the IaaS provider that can facilitate communication between the control plane VCN 316 and the data plane VCN 318. In another example, the control plane VCN 316 or the data plane VCN 318 can make a call to cloud services 356 via the service gateway 336. For example, a call to cloud services 356 from the control plane VCN 316 can include a request for a service that can communicate with the data plane VCN 318.

Figure 4:
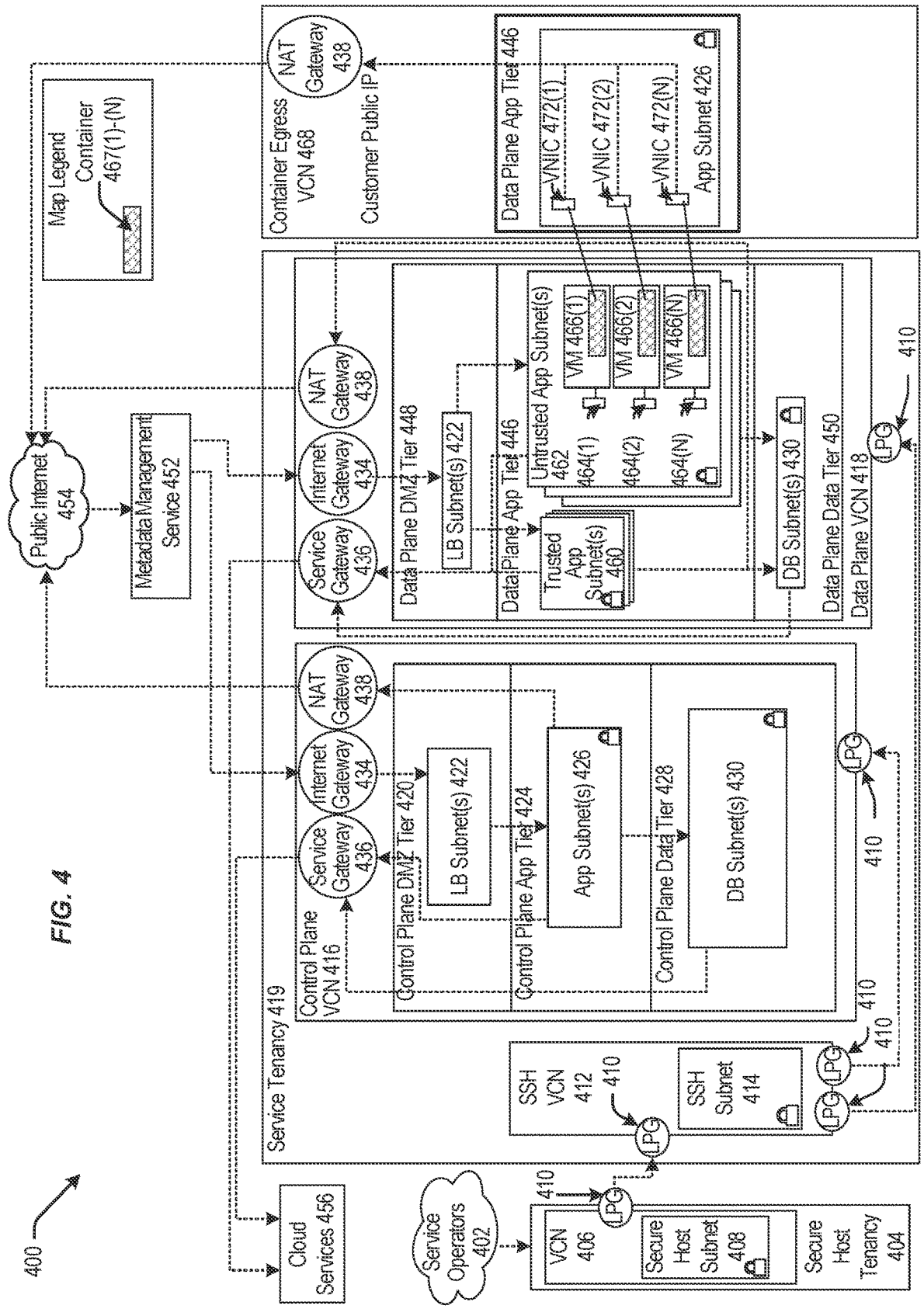

FIG. 4 is a block diagram illustrating another example pattern of an IaaS architecture 400, according to at least one embodiment. Service operators 402 (e.g., service operators 102 of FIG. 1) can be communicatively coupled to a secure host tenancy 404 (e.g., the secure host tenancy 104 of FIG. 1) that can include a virtual cloud network (VCN) 406 (e.g., the VCN 106 of FIG. 1) and a secure host subnet 408 (e.g., the secure host subnet 108 of FIG. 1). The VCN 406 can include an LPG 410 (e.g., the LPG 110 of FIG. 1) that can be communicatively coupled to an SSH VCN 412 (e.g., the SSH VCN 112 of FIG. 1) via an LPG 410 contained in the SSH VCN 412. The SSH VCN 412 can include an SSH subnet 414 (e.g., the SSH subnet 114 of FIG. 1), and the SSH VCN 412 can be communicatively coupled to a control plane VCN 416 (e.g., the control plane VCN 116 of FIG. 1) via an LPG 410 contained in the control plane VCN 416 and to a data plane VCN 418 (e.g., the data plane VCN 118 of FIG. 1) via an LPG 410 contained in the data plane VCN 418. The control plane VCN 416 and the data plane VCN 418 can be contained in a service tenancy 419 (e.g., the service tenancy 119 of FIG. 1).

The control plane VCN 416 can include a control plane DMZ tier 420 (e.g., the control plane DMZ tier 120 of FIG. 1) that can include LB subnet(s) 422 (e.g., LB subnet(s) 122 of FIG. 1), a control plane app tier 424 (e.g., the control plane app tier 124 of FIG. 1) that can include app subnet(s) 426 (e.g., app subnet(s) 126 of FIG. 1), a control plane data tier 428 (e.g., the control plane data tier 128 of FIG. 1) that can include DB subnet(s) 430 (e.g., DB subnet(s) 330 of FIG. 3). The LB subnet(s) 422 contained in the control plane DMZ tier 420 can be communicatively coupled to the app subnet(s) 426 contained in the control plane app tier 424 and to an Internet gateway 434 (e.g., the Internet gateway 134 of FIG. 1) that can be contained in the control plane VCN 416, and the app subnet(s) 426 can be communicatively coupled to the DB subnet(s) 430 contained in the control plane data tier 428 and to a service gateway 436 (e.g., the service gateway of FIG. 1) and a network address translation (NAT) gateway 438 (e.g., the NAT gateway 138 of FIG. 1). The control plane VCN 416 can include the service gateway 436 and the NAT gateway 438.

The data plane VCN 418 can include a data plane app tier 446 (e.g., the data plane app tier 146 of FIG. 1), a data plane DMZ tier 448 (e.g., the data plane DMZ tier 148 of FIG. 1), and a data plane data tier 450 (e.g., the data plane data tier 150 of FIG. 1). The data plane DMZ tier 448 can include LB subnet(s) 422 that can be communicatively coupled to trusted app subnet(s) 460 (e.g., trusted app subnet(s) 360 of FIG. 3) and untrusted app subnet(s) 462 (e.g., untrusted app subnet(s) 362 of FIG. 3) of the data plane app tier 446 and the Internet gateway 434 contained in the data plane VCN 418. The trusted app subnet(s) 460 can be communicatively coupled to the service gateway 436 contained in the data plane VCN 418, the NAT gateway 438 contained in the data plane VCN 418, and DB subnet(s) 430 contained in the data plane data tier 450. The untrusted app subnet(s) 462 can be communicatively coupled to the service gateway 436 contained in the data plane VCN 418 and DB subnet(s) 430 contained in the data plane data tier 450. The data plane data tier 450 can include DB subnet(s) 430 that can be communicatively coupled to the service gateway 436 contained in the data plane VCN 418.

The untrusted app subnet(s) 462 can include primary VNICs 464(1)-(N) that can be communicatively coupled to tenant virtual machines (VMs) 466(1)-(N) residing within the untrusted app subnet(s) 462. Each tenant VM 466(1)-(N) can run code in a respective container 467(1)-(N), and be communicatively coupled to an app subnet 426 that can be contained in a data plane app tier 446 that can be contained in a container egress VCN 468. Respective secondary VNICs 472(1)-(N) can facilitate communication between the untrusted app subnet(s) 462 contained in the data plane VCN 418 and the app subnet contained in the container egress VCN 468. The container egress VCN can include a NAT gateway 438 that can be communicatively coupled to public Internet 454 (e.g., public Internet 154 of FIG. 1).

The Internet gateway 434 contained in the control plane VCN 416 and contained in the data plane VCN 418 can be communicatively coupled to a metadata management service 452 (e.g., the metadata management service 152 of FIG. 1) that can be communicatively coupled to public Internet 454. Public Internet 454 can be communicatively coupled to the NAT gateway 438 contained in the control plane VCN 416 and contained in the data plane VCN 418. The service gateway 436 contained in the control plane VCN 416 and contained in the data plane VCN 418 can be communicatively couple to cloud services 456.

In some examples, the pattern illustrated by the architecture of block diagram 400 of FIG. 4 may be considered an exception to the pattern illustrated by the architecture of block diagram 300 of FIG. 3 and may be desirable for a customer of the IaaS provider if the IaaS provider cannot directly communicate with the customer (e.g., a disconnected region). The respective containers 467(1)-(N) that are contained in the VMs 466(1)-(N) for each customer can be accessed in real-time by the customer. The containers 467(1)-(N) may be configured to make calls to respective secondary VNICs 472(1)-(N) contained in app subnet(s) 426 of the data plane app tier 446 that can be contained in the container egress VCN 468. The secondary VNICs 472(1)-(N) can transmit the calls to the NAT gateway 438 that may transmit the calls to public Internet 454. In this example, the containers 467(1)-(N) that can be accessed in real-time by the customer can be isolated from the control plane VCN 416 and can be isolated from other entities contained in the data plane VCN 418. The containers 467(1)-(N) may also be isolated from resources from other customers.

In other examples, the customer can use the containers 467(1)-(N) to call cloud services 456. In this example, the customer may run code in the containers 467(1)-(N) that requests a service from cloud services 456. The containers 467(1)-(N) can transmit this request to the secondary VNICs 472(1)-(N) that can transmit the request to the NAT gateway that can transmit the request to public Internet 454. Public Internet 454 can transmit the request to LB subnet(s) 422 contained in the control plane VCN 416 via the Internet gateway 434. In response to determining the request is valid, the LB subnet(s) can transmit the request to app subnet(s) 426 that can transmit the request to cloud services 456 via the service gateway 436.

It should be appreciated that IaaS architectures 100, 200, 300, 400 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

4. Computer System

Figure 5:
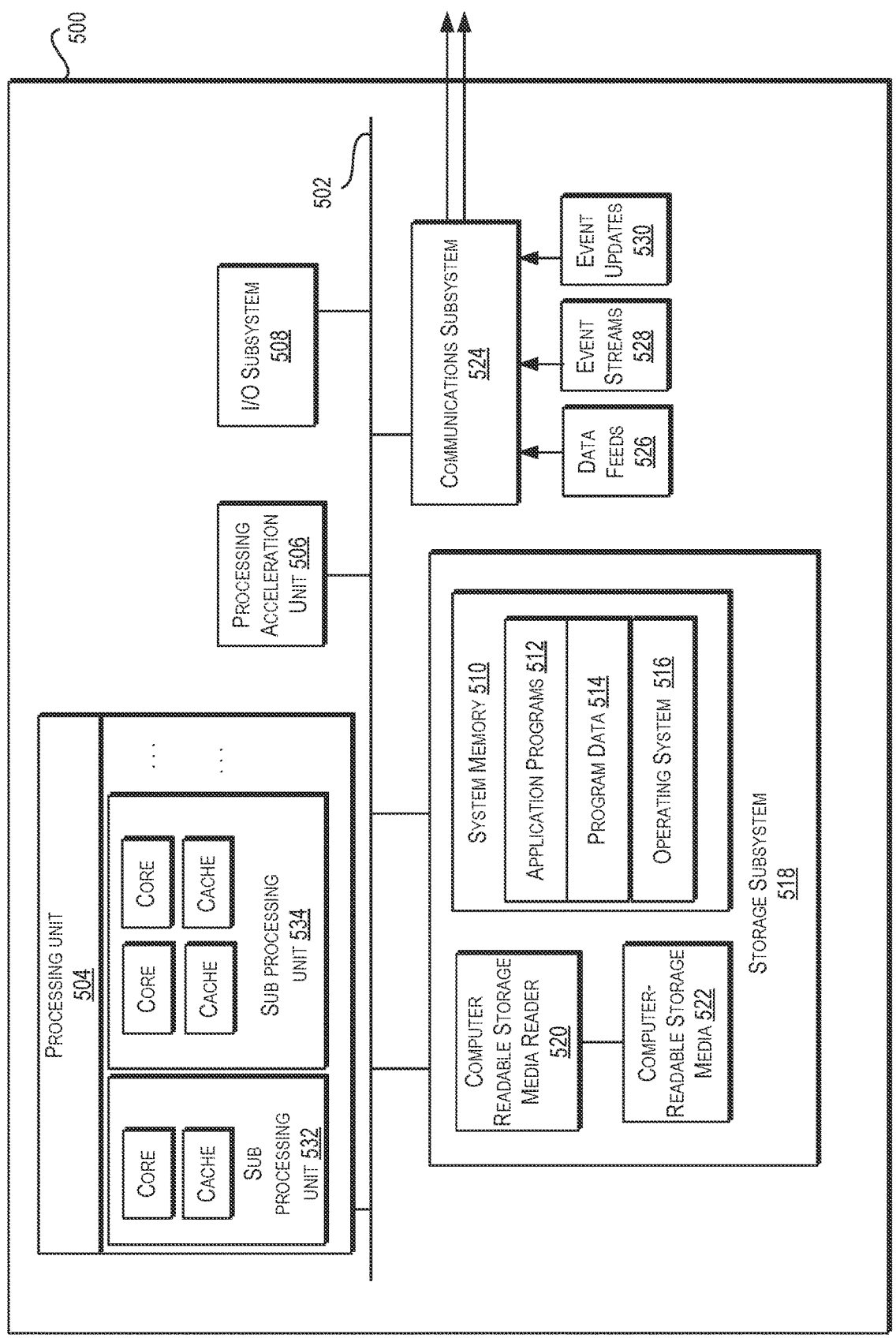
FIG. 5 is a hardware system in accordance with one or more embodiments.

FIG. 5 illustrates an example computer system 500, in which various embodiments may be implemented. The system 500 may be used to implement any of the computer systems described above. As shown in FIG. 5, computer system 500 includes a processing unit 504 that communicates with a number of peripheral subsystems via a bus subsystem 502. These peripheral subsystems may include a processing acceleration unit 506, an I/O subsystem 508, a storage subsystem 518 and a communications subsystem 524. Storage subsystem 518 includes tangible computer-readable storage media 522 and a system memory 510.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which can be implemented as one or more integrated circuits (e.g., a conventional microprocessor or microcontroller), controls the operation of computer system 500. One or more processors may be included in processing unit 504. These processors may include single core or multicore processors. In certain embodiments, processing unit 504 may be implemented as one or more independent processing units 532 and/or 534 with single or multicore processors included in each processing unit. In other embodiments, processing unit 504 may also be implemented as a quad-core processing unit formed by integrating two dual-core processors into a single chip.

In various embodiments, processing unit 504 can execute a variety of programs in response to program code and can maintain multiple concurrently executing programs or processes. At any given time, some or all of the program code to be executed can be resident in processing unit 504 and/or in storage subsystem 518. Through suitable programming, processing unit 504 can provide various functionalities described above. Computer system 500 may additionally include a processing acceleration unit 506, which can include a digital signal processor (DSP), a special-purpose processor, and/or the like.

I/O subsystem 508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting: information from computer system 500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 500 may comprise a storage subsystem 518 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 504 provide the functionality described above. Storage subsystem 518 may also provide a repository for storing data used in accordance with the present disclosure.

As depicted in the example in FIG. 5, storage subsystem 518 can include various components including a system memory 510, computer-readable storage media 522, and a computer readable storage media reader 520. System memory 510 may store program instructions, such as application programs 512, that are loadable and executable by processing unit 504. System memory 510 may also store data, such as program data 514, that is used during the execution of the instructions and/or data that is generated during the execution of the program instructions. Various different kinds of programs may be loaded into system memory 510 including but not limited to client applications, Web browsers, mid-tier applications, relational database management systems (RDBMS), virtual machines, containers, etc.

System memory 510 may also store an operating system 516. Examples of operating system 516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 500 executes one or more virtual machines, the virtual machines along with their guest operating systems (GOSs) may be loaded into system memory 510 and executed by one or more processors or cores of processing unit 504.

System memory 510 can come in different configurations depending upon the type of computer system 500. For example, system memory 510 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 510 may include a basic input/output system (BIOS) containing basic routines that help to transfer information between elements within computer system 500, such as during start-up.

Computer-readable storage media 522 may represent remote, local, fixed, and/or removable storage devices plus storage media for temporarily and/or more permanently containing, storing, computer-readable information for use by computer system 500 including instructions executable by processing unit 504 of computer system 500.

Computer-readable storage media 522 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 522 may include, but is not limited to, Zip® drives, flash memory cards, universal serial bus (USB) flash drives, secure digital (SD) cards, DVD disks, digital video tape, and the like. Computer-readable storage media 522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Machine-readable instructions executable by one or more processors or cores of processing unit 504 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 524 provides an interface to other computer systems and networks. Communications subsystem 524 serves as an interface for receiving data from and transmitting data to other systems from computer system 500. For example, communications subsystem 524 may enable computer system 500 to connect to one or more devices via the Internet. In some embodiments communications subsystem 524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 524 can provide wired network connectivity (e.g., Ethernet) in addition to or instead of a wireless interface.

In some embodiments, communications subsystem 524 may also receive input communication in the form of structured and/or unstructured data feeds 526, event streams 528, event updates 530, and the like on behalf of one or more users who may use computer system 500.

By way of example, communications subsystem 524 may be configured to receive data feeds 526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 524 may also be configured to receive data in the form of continuous data streams, which may include event streams 528 of real-time events and/or event updates 530, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 524 may also be configured to output the structured and/or unstructured data feeds 526, event streams 528, event updates 530, and the like to one or more databases that may be in communication with one or more streaming data source computers coupled to computer system 500.

Computer system 500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 500 depicted in FIG. 5 is intended only as a specific example. Many other configurations having more or fewer components than the system depicted in FIG. 5 are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

5. Architectural Overview

Figure 6A:
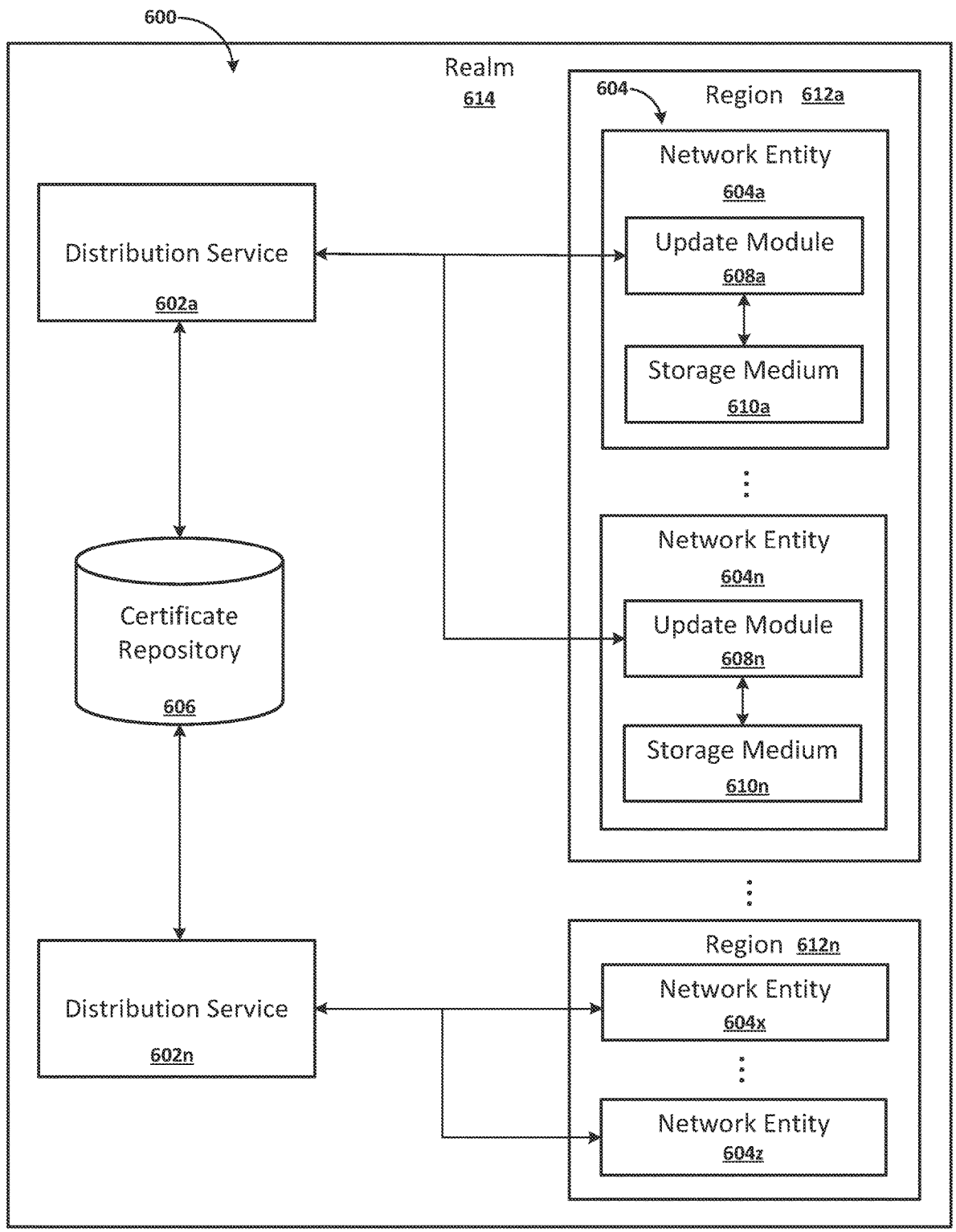
FIGS. 6A and 6B respectively illustrate an example virtual cloud network in accordance with one or more embodiments.
Figure 6B:
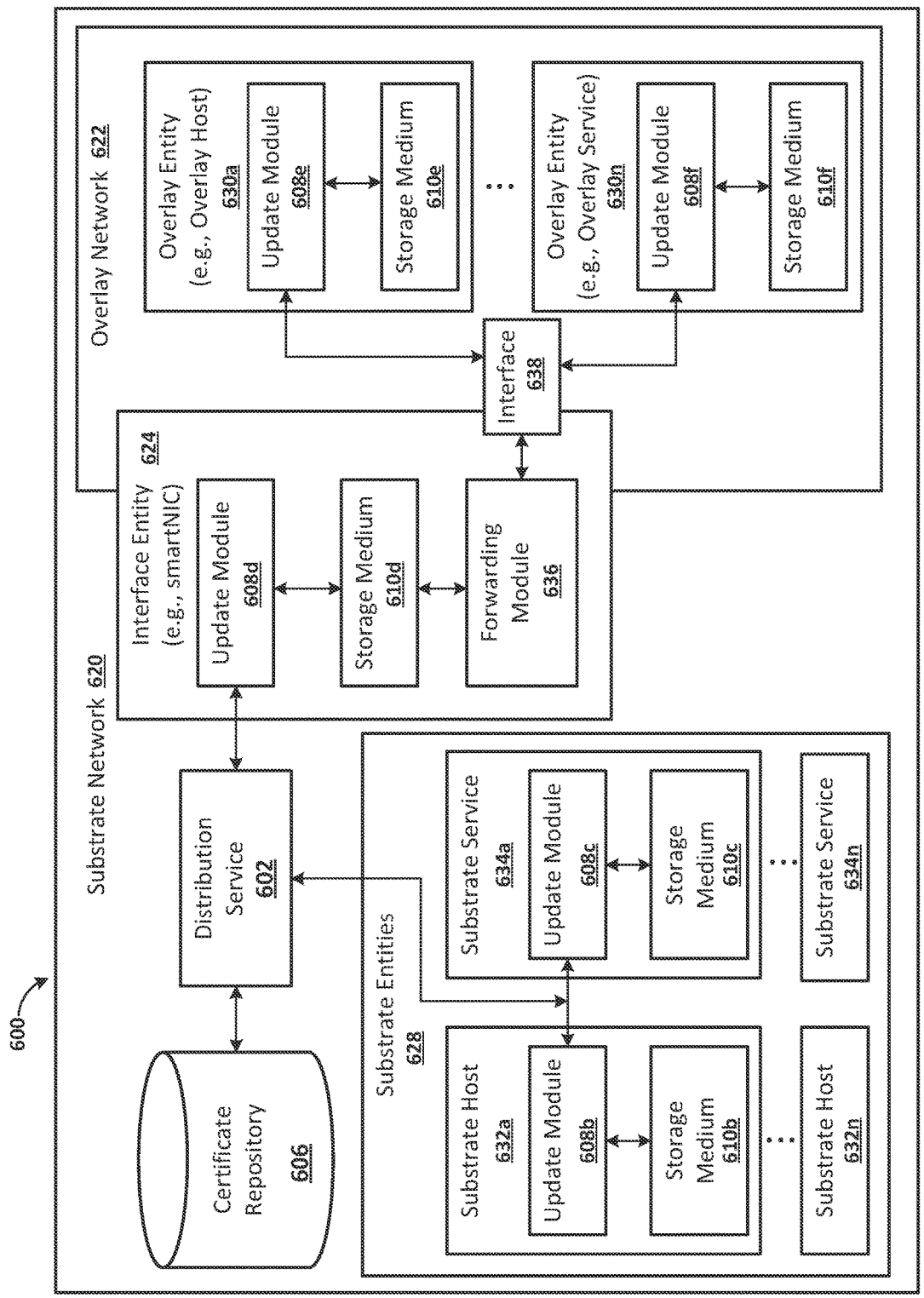

FIGS. 6A and 6B respectively illustrate one example of a system 600 in accordance with one or more embodiments. The system 600 described with reference to FIGS. 6A and 6B may be utilized to distribute certificate bundles to network entities associated with a virtual cloud network. As illustrated in FIGS. 6A and 6B, a system 600 may include at least one distribution service 602, and a set of network entities 604. A distribution service 602 may be configured to distribute certificate bundles that include CA certificates to the set of network entities.

The certificate bundles may be housed in a certificate repository 606. The distribution service 602 may retrieve a certificate bundle from the certificate repository 606 and send the certificate bundle to the set of network entities 604. In one example, a certificate repository 606 is any type of storage unit and/or device (e.g., a file system, database, collection of tables, or any other storage mechanism) for storing data. Further, a certificate repository 606 may include multiple different storage units and/or devices. The multiple different storage units and/or devices may or may not be of the same type or located at the same physical site. Further, a certificate repository 606 may be implemented or executed on the same computing system as a distribution service 602 and/or the set of network entities 604. Additionally, or in the alternative, a certificate repository 606 may be implemented or executed on a computing system separate from a distribution service 602 and/or the set of network entities 604. The certificate repository 606 may be communicatively coupled to a distribution service 602 via a direct connection or via a network.

In one example, as shown in FIG. 6A, the system 600 may include distribution service 602a and distribution service 602n. Distribution service 602a may distribute certificate bundles to a set of network entities 604 that includes network entity 604a and network entity 604n. Additionally, or in the alternative, distribution service 602n may distribute certificate bundles to another set of network entities 604 that includes network entity 604x and network entity 604z.

A network entity 604 may include an update module 608 and a storage medium 610. In one example, network entity 604a may include update module 608a and a storage medium 610a. Additionally, or in the alternative, network entity 604n may include update module 608n and a storage medium 610n. An update module 608 may periodically request an updated certificate bundle from the distribution service 602. The distribution service 602 may distribute a certificate bundle to the update module responsive to a request from the update module 608 for an updated certificate bundle. Additionally, or in the alternative, the distribution service may push updated certificate bundles to an update module 608, for example, without receiving a request from the update module 608.

In one example, a distribution service 602 may distribute certificate bundles to a set of network entities 604 associated with a region. For example, distribution service 602a may distribute certificate bundles to network entities 604a and 604n associated with region 612a. Additionally, or in the alternative, distribution service 602n may distribute certificate bundles to network entities 604x and 604z associated with region 612n. In one example, the system 600 may include a set of regions 612, such as regions 612a and 612n. In one example, the set of regions may be associated with a realm 614. In one example, the system 600 may include a set of realms 614 that respectively include a set of regions 612. As used herein, the term "region" refers to a set of one or more interconnected data centers upon which a virtual cloud network is deployed. In one example, a region may correspond to a physical geographic area. In one example, a region may correspond to multiple physical geographic areas and/or a portion of a physical geographic area. As used herein, the term "realm" refers to a distinct deployment of an IaaS system infrastructure. In one example, regions within a realm may communicate with one another. In one example, regions from different realms may be unable to communicate with one another.

A network entity 604 may include an endpoint implemented in hardware and/or software in association with a virtual cloud network, such as a node, a host, an agent, a service, a component, or other element. A network entity 604 may exist within a substrate, an overlay instance, or within an interface between a substrate and an overlay instance.

In one example, the set of network entities 604 may include a set of substrate entities. As used herein, the term "substrate entity" refers to a network entity 604 implemented in a substrate network. As used herein, the term "substrate network" refers to a physical network infrastructure. The substrate network generally provides a foundation of a virtual cloud network. A substrate network may include physical network devices, such as routers, switches, network links, and other networking components. The substrate network may generally provide the basic connectivity and transport capabilities necessary for data transmission within and between data centers.

A set of substrate entities may include substrate hosts (e.g., bare metal hosts), routers, firewall appliances, load balancers, storage devices, and/or substrate services. Substrate services may include one or more services executing or executable on a substrate entity, such as firmware services, network connectivity services, addressing services, name resolution services, security services, network monitoring services, load balancing services, and/or storage services. Firmware services may be associated with functionality or management of network infrastructure components or services, such as network devices, boot-up or initialization process, hardware controls, feature enablement, updates, hardware abstraction, network configuration, and/or network management. In one example, a substrate entity may include a combination of hardware and software.

In one example, the set of network entities 604 may include a set of overlay entities. As used herein, the term "overlay entity" refers to a network entity 604 implemented in an overlay network. As used herein, the term "overlay network" refers to a virtual network built on a substrate network using software-defined networking (SDN), virtualization, tunneling, and/or encapsulation technologies. An overlay network generally operates independently of the underlying substrate network. An overlay network may provide logical separation and isolation of traffic, enable virtual network provisioning, and/or allow for implementation of various network services and policies. Virtual machines, hosts, containers, or virtual network functions running on a substrate network may be connected via an overlay network.

A set of overlay entities may include overlay hosts, subnets, overlay controllers, and/or overlay clients. An overlay host may include an endpoint within an overlay network, such as a virtual machine, a container, or a physical server. Overlay hosts may communicate with one another using logical network addresses assigned within the overlay network. A subnet may include a virtual network segment that has a distinct addressing scheme and/or a distinct set of network policies and/or services. A subnet may include a set of overlay hosts. Multiple subnets may be utilized to partition respective sets of overlay hosts. An overlay controller may oversee management, control, provisioning, configuration, and/or monitoring of an overlay network, network entities on the overlay network, and/or network policies within the overlay. An overlay controller interact with the underlying substrate network, for example, to coordinate the operation of overlay hosts and/or communications across virtual switches and tunnels. An overlay client may include an endpoint or device that initiates communication within the overlay network. An overlay client may be a specific instance or role within an overlay host. An overlay host may include a set of overlay clients. An overlay client may include a consumer or user of services provided by overlay hosts or the IaaS. An overlay client may request and consume resources or services from overlay hosts, acting as consumers or clients of those resources or services. Overlay services may include one or more services executing or executable on an overlay entity. Overlay services may include client-specific services, such as services installed by a client. Additionally, or in the alternative, overlay services may include virtual network creation services, virtual network management services, virtual machine orchestration services, container orchestration services, network virtualization services, overlay security services, load balancing services, multi-tenancy services, and/or tenant isolation services.

In one example, the set of network entities 604 may include a set of interface entities. As used herein, the term "interface entity" refers to a network entity 604 implemented on a network interface. As used herein, the term "network interface" refers to a communication interface between an overlay network and a substrate network, such as a network interface card, a smartNIC, or the like. An interface entity may include a network interface card, such as a smartNIC, a node on the network interface card, or an interface service executing or executable on an interface entity. A node on a network interface card may include a programmable hardware component, a memory component, or a gateway component.

A gateway component may provide connectivity between an overlay network and a substrate network. For example, a gateway component may enable communication between overlay entities and substrate entities. Additionally, or in the alternative, a gateway component may provide connectivity between an overlay network and external networks, such as the internet or other networks outside the overlay network. For example, an overlay gateway may enable communication between overlay entities and external endpoints.

Referring further to FIG. 6B, in one example, the system 600 may include a substrate network 620, and overlay network 622, and an interface entity 624 that provides communication between the substrate network 620 and the overlay network 622. The substrate network 620 may include a certificate repository 626, a distribution service 602, and one or more substrate entities 628. The one or more substrate entities 628 may include one or more substrate hosts 632 (e.g., substrate host 632a and substrate host 632n), and/or one or more substrate services 634 (e.g., substrate host 632a and substrate host 632n). In one example, a substrate host 632 may include a bare metal host. In one example, a substrate service 634 may include a firmware service. The overlay network 622 may include a set of overlay entities 630, such as overlay entity 630a and overlay entity 630n. In one example, the set of overlay entities 630 may include overlay hosts. Additionally, or in the alternative, the set of overlay entities 630 may include overlay services. In one example, an interface entity 624 may include a network interface card, such as a smartNIC. Additionally, or in the alternative, an interface entity 624 may include a node or an endpoint on a network interface card or smart NIC.

As shown in FIG. 6B, the system 600 may include a distribution service 602. The distribution service 602 may be implemented on the substrate network 620. The distribution service 602 may be communicatively coupled with one or more substrate entities 628 and/or with one or more interface entities 624. The distribution service 602 may obtain certificate bundles from a certificate repository 606. The certificate repository 606 may include a storage medium on the substrate network 620 or other physical hardware of a virtual cloud network. In one example, the distribution service 602 may distribute certificate bundles to the set of substrate entities 628, such as to the set of substrate hosts 632 and/or to the set of substrate services 634. Additionally, or in the alternative, the distribution service 602 may distribute certificate bundles to an interface entity 624.

As further shown in FIG. 6B, an interface entity 624 may include a forwarding module 636. The forwarding module 636 may forward certificate bundles, such as certificate bundles received by the interface entity 624 from the distribution service 602, to a set of overlay entities 630 on the overlay network 622. The forwarding module 636 may forward certificate bundles to an overlay entity 630 responsive to a request from the overlay entity 630 for an updated certificate bundle. Additionally, or in the alternative, the forwarding module 636 may push updated certificate bundles to an overlay entity 630, for example, without receiving a request from the overlay entity 630.

Requests for updated certificate bundles from the set of overlay entities 603 may be provided by way of an interface 638 between the interface entity and the set of overlay entities 630. Additionally, or in the alternative, the certificate bundles may be forwarded to the set of overlay entities 630 via the interface 638. In one example, the interface 638 may be a metadata interface configured for exchanging metadata between the interface entity 624 and the set of overlay entities 630. In one example, the interface 638 may be utilized between the interface entity 624 and each of the set of overlay entities 630. Additionally, or in the alternative, the interface entity 624 may have a set of interfaces 638, with each interface 638 corresponding to a respective overlay entity 630.

As shown in FIG. 6B, and with further reference to FIG. 6A, each network entity 604 may include an update module 608 and a storage medium 610 associated with the network entity 604. In one example, with respect to the substrate entities 628, the distribution service 602 may distribute certificate bundles to update module 608b of substrate host 632a, and the certificate bundles may be stored in storage medium 610b. Additionally, or in the alternative, the distribution service 602 may distribute certificate bundles to update module 608c of substrate service 634a, and the certificate bundles may be stored in storage medium 610c.

In one example, with respect to the interface entity 624, the distribution service 602 may distribute certificate bundles to update module 608d, and the certificate bundles may be stored in storage medium 610d. The forwarding module 636 may obtain certificate bundles from storage medium 610d and forward the certificate bundles to the set of overlay entities 630.

In one example, with respect to the set of overlay entities 630, the forwarding module 636 may forward certificate bundles to update module 608e of overlay entity 630a, and the certificate bundles may be stored in storage medium 610e. Additionally, or in the alternative, the forwarding module 636 may forward certificate bundles to update module 608f of overlay entity 630n, and the certificate bundles may be stored in storage medium 610f.

In one or more embodiments, the system 600 may include more or fewer components than the components illustrated in FIG. 6A or 6B. The components illustrated in FIGS. 6A and 6B may be local to or remote from each other. The components illustrated in FIGS. 6A and 6B may include software and/or hardware components. Each component may be distributed over multiple applications and/or machines. Multiple components may be combined into one application and/or machine. Operations described with respect to one component may instead be performed by another component. Additional embodiments and/or examples relating to the system 600 are described above in Section 2, titled "Cloud Computing Technology".

In an embodiment, the system 600 may include various components implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

6. Authenticating Network Entities

Network entities may utilize the CA certificates in a certificate bundle to authenticate other network entities associated with the virtual cloud network. For example, communications between network entities may be conducted according to a security protocol. The security protocol may include authenticating a network entity based on an entity certificate issued to the network entity by a CA, for example, prior to establishing communications with the network entity.

In one example, the entity certificate and a CA certificate corresponding to the CA that issued the entity certificate may represent at least a portion of a certificate chain. To authenticate the network entity, each signature-key pair in the certificate chain is validated. In one example, a top-level CA may issue the entity certificate, in which case the certificate chain may include one signature-key pair—that is, the digital signature of the top-level CA in the entity certificate, and the public key of the top-level CA. Such a top-level CA is sometimes referred to as a root CA. In another example, the certificate chain may include signature-key pairs corresponding to multiple CA certificates. For example, a root CA may issue an intermediate CA certificate to an intermediate CA, and the intermediate CA may issue the entity certificate to the network entity. In this case, the certificate chain includes two signature-key pairs—that is, (i) the digital signature of the intermediate CA in the entity certificate, and the public key of the intermediate CA; and (ii) the digital signature of the root CA in the intermediate CA certificate, and the public key of the root CA.

As used herein, the term "certificate authority certificate" or "CA certificate" refers to a digital certificate issued by a CA to establish its own identity and authenticity. A certificate authority certificate may be a root CA certificate or an intermediate CA certificate. A certificate authority certificate may be used to sign and issue other digital certificates, including those used for secure communication between network entities.

As used herein, the term "certificate authority" or "CA" refers to an entity responsible for issuing and managing digital certificates. The CA verifies the identity of network entities and digitally signs their certificates to attest to their authenticity.

As used herein, the term "root certificate authority certificate" or "root CA certificate" refers to a top-level CA certificate in a certificate chain or hierarchy. A root CA certificate may be self-issued and/or self-signed by a root CA. As used herein, the term "root CA" refers to a top-level CA in a CA hierarchy. A root CA may issue root CA certificates, intermediate CA certificates, or entity certificates.

As used herein, the term "intermediate certificate authority certificate" or "intermediate CA certificate" refers to an intermediate-level CA certificate in a certificate chain or hierarchy. An intermediate CA certificate may be issued by a root CA. An intermediate CA certificate is located between a root CA certificate and an entity certificate in a certificate chain or hierarchy. As used herein, the term "intermediate CA" refers to an intermediate-level CA in a CA hierarchy. An intermediate CA may issue entity certificates, for example, pursuant to authority granted to an intermediate CA according to a root CA.

As used herein, the term "entity certificate" refers to a digital certificate issued to an entity, such as a network entity associated with a virtual cloud network. An entity certificate may be used to verify the identity of the entity and enable secure communication between entities, such as between network entities in a virtual cloud network. An entity certificate may be issued by a CA, such as root CA or an intermediate CA.

In one example, an entity certificate may be an instance principal certificate. As used herein, the term "instance principal certificate" refers to a digital certificate used to authenticate and secure communication for an instance or VM associated with a virtual cloud network. In one example, instances and VMs may be created, scaled, and terminated dynamically. Instance principal certificates may be associated with an instance or VAM during its lifecycle and may be automatically generated and managed by the virtual cloud network infrastructure. An instance principal certificate may have limited access to communicate with certain network entities based on permissions assigned to the network entity to which the instance principal certificate is issued.

As used herein, the term "digital certificate" refers to a digitally signed electronic document that binds a public key to the identity of an entity. A digital certificate may conform to International Telecommunication Union standard X.509. A digital certificate may include an issuer's name, a certificate holder's name, a public key, issuer (CA) information, and expiration date. Digital certificates may be used in various security protocols, such as SSL/TLS, to establish the identity and authenticity of the communicating parties and facilitate secure communication.

6. Updating Certificate Authority Certificates

Figure 7:
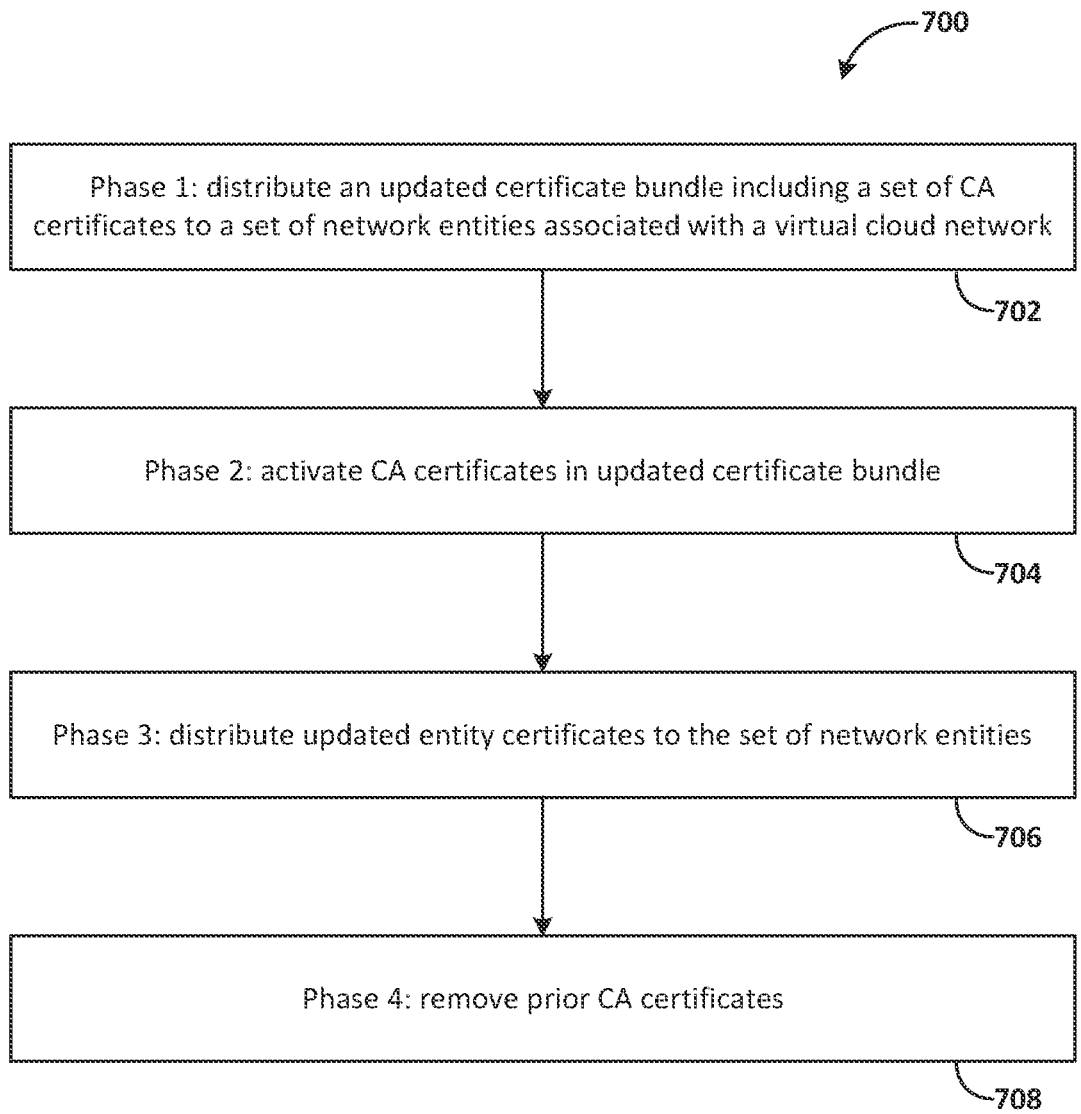
FIG. 7 is a flowchart that illustrates example operations pertaining to updating CA certificates in accordance with one or more embodiments.

Referring now to FIG. 7, operations pertaining to updating CA certificates are further described. One or more operations 700 illustrated in FIG. 7 may be modified, rearranged, or omitted all together. Accordingly, the particular sequence of operations 700 illustrated in FIG. 7 should not be construed as limiting the scope of one or more embodiments. As shown in FIG. 7, operations 700 for distributing certificate bundles may include a series or sequence of phases. In one example, as shown, the operations 700 may include a series or sequence of phases, such as four (4) phases. In another example, the series or sequence of phases may include more or less than four (4) phases, including all or a portion of the phases shown in FIG. 7.

FIG. 7 illustrates an example set of operations 700 associated with updating CA certificates in accordance with one or more embodiments. The CA certificates may include root CA certificates and/or intermediate CA certificates. The CA certificates may be housed in a certificate bundle. In one example, the operations 700 may include, at block 702, distributing an intermediate certificate bundle including a set of CA certificates to a set of network entities associated with a virtual cloud network. Additionally, or in the alternative, a set of new CA certificates may be added to existing certificate bundles . . . . The operation at block 702 may represent Phase 1 of a certificate bundle distribution process.

In one example, the operations 700 may include, at block 704, activating the CA certificates in the intermediate certificate bundle. In one example, activating the CA certificate may include a CA corresponding to the CA certificate issuing one or more intermediate CA certificates. The operation at block 704 may represent Phase 2 of a certificate bundle distribution process.

In one example, the operations 700 may include, at block 706, distributing updated entity certificates to the set of network entities. Additionally, or in the alternative, the operations 700 may include distributing updated intermediate CA certificates, for example, corresponding to the updated entity certificates. The operation at block 706 may represent Phase 3 of a certificate bundle distribution process.

In one example, the operations 700 may include, at block 708, removing earlier CA certificates. Removing the earlier CA certificates may include distributing an updated certificate bundle that includes only new CA certificates, thereby effectively removing old CA certificates. Additionally, or in the alternative, removing the earlier CA certificates may include instructing network entities to delete old CA certificates from the updated certificate bundle. The operation at block 708 may represent Phase 4 of a certificate bundle distribution process.

8. Distributing Certificate Bundles

A. Distribution Operation Timelines

Referring now to FIGS. 8A-8D, operations pertaining to distributing certificate bundles to network entities associated with a virtual cloud network are further described. One or more operations 800 described with reference to in FIGS. 8A-8D may be modified, rearranged, or omitted all together. Accordingly, the particular sequence of operations 800 described with reference to FIGS. 8A-8D should not be construed as limiting the scope of one or more embodiments. In one example, the operations 800 described with reference to FIGS. 8A-8D may correspond to Phase 1 and/or Phase 4 of the operations described with reference to FIG. 7.

FIGS. 8A-8D illustrate an example set of operations 800 pertaining to distributing certificate bundles in accordance with one or more embodiments. The certificate bundles may include a set of CA certificates, including root CA certificates and/or intermediate CA certificates. The operations 800 shown in FIGS. 8A-8D represent a timeline that progresses from top to bottom. The operations 800 may include operations of a distribution service 802, shown on a distribution service timeline 804. Additionally, or in the alternative, the operations 800 may include operations of a network entity 806 and/or an update module 808, shown on a network entity timeline 810. The operations 800 described with reference to FIGS. 8A-8D may be performed with respect to a set of network entities 806 associated with a virtual cloud network. Additionally, or in the alternative, the operations 800 described with reference to FIGS. 8A-8D may be performed with respect to at least one distribution service 802 associated with a set of network entities 806.

Figure 8A:
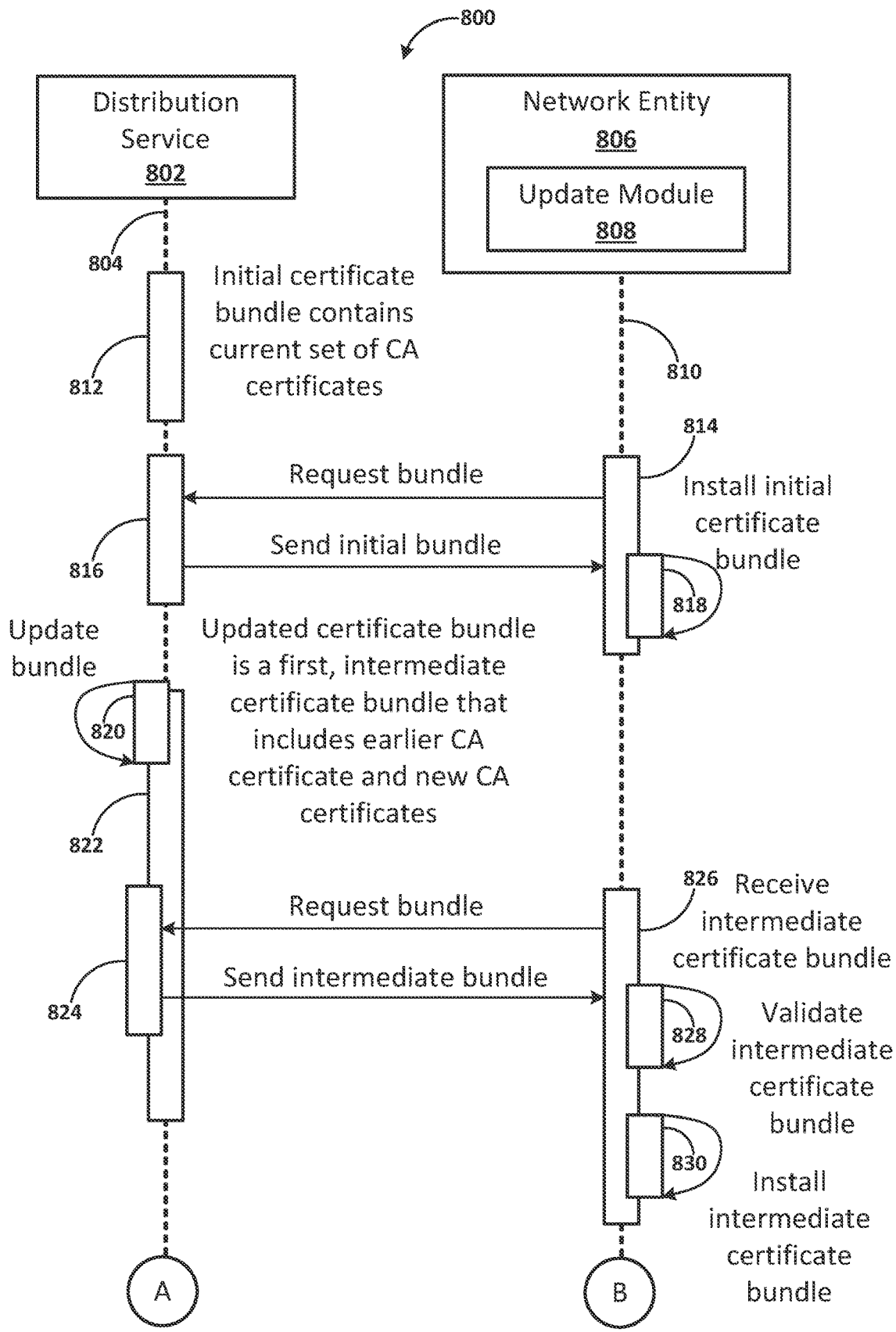
FIGS. 8A-8D are timelines that further illustrate example operations pertaining to distributing certificate bundles to network entities associated with a virtual cloud network in accordance with one or more embodiments.

Referring to FIG. 8A, at a time 812, the distribution service 802 may obtain an initial certificate bundle that contains a current set of CA certificates. The distribution service 802 may distribute the certificate bundle to various network entities, and the network entities may utilize the CA certificates in the certificate bundle to validate network entities associated with the virtual cloud network. As shown in FIG. 8A, at a time 814, a network entity 806 may request a certificate bundle. For example, the update module 808 of the network entity 806 may send a request for the certificate bundle to the distribution service 802. At a time 816, the distribution service 802 may receive the request for the certificate bundle. Responsive to the request, the distribution service 802 may send the certificate bundle to the network entity 806, such as to the update module 808 of the network entity 806. At a time 818, the update module 808 may install the certificate bundle received from the distribution service 802.

In one example, the update module 808 may periodically request a certificate bundle from the distribution service 802. The distribution service 802 may respond to periodic requests by sending a certificate bundle to the update module 808. In one example, the distribution service 802 may send a certificate bundle to the update module 808, for example, in response to a periodic request from the update module 808, when an updated certificate bundle is available. When an updated certificate bundle is unavailable, the distribution service 802 may refrain from sending a certificate bundle to the update module 808 in response to a periodic request from the update module 808. In one example, when an updated certificate bundle is unavailable, such as when the distribution service 802 has previously sent the latest certificate bundle to the update module 808, the update module 808 may respond to a periodic request from the distribution service 802 with a message indicating that an updated certificate bundle is unavailable. In one example, a period request from the update module 808 may include an indication of the version of the certificate bundle being utilized by the network entity 806. The distribution service 802 may determine whether to send a certificate bundle to the update module 808 based on the indication of the version included in the periodic request.

At a time 820, the distribution service 802 may update the initial certificate bundle with an updated certificate bundle. The updated certificate bundle may be an intermediate certificate bundle. The distribution service 802 may receive the intermediate certificate bundle from a source, such as from a CA. Additionally, or in the alternative, the distribution service 802 may generate the intermediate certificate bundle. In one example, the distribution service 802 may receive one or more new CA certificates, such as from one or more CAs, and the distribution service 802 may generate an intermediate certificate bundle that includes the one or more new CA certificates. For example, the distribution service 802 may generate the intermediate certificate bundle by adding the new CA certificates to a prior certificate bundle that includes earlier CA certificates. The new CA certificates may include new CA certificates or pre-existing CA certificates. For example, a new CA certificate may be newly issued and included in the intermediate certificate bundle when the new CA certificate is intended to supersede a earlier CA certificate. As another example, a new CA certificate that is pre-existing may be included in the intermediate certificate bundle when the network entities are intended to begin communications with a pre-existing network entity associated with the CA certificate.

At a time 822, an updated certificate bundle, such as an intermediate certificate bundle, may be available for distribution by the distribution service 802. The intermediate certificate bundle may include a set of earlier CA certificates that were included in the certificate bundle prior to the update as well as a set of new CA certificates added to the certificate bundle in connection with the update. The set of earlier CA certificates that included in the intermediate certificate bundle may be currently being used by the network entities to authenticate other entities. The set of new CA certificates included in the intermediate certificate bundle may supersede at least some of the earlier CA certificates. The set of CA certificates added to the certificate bundle in connection with the update may sometimes be referred to as new CA certificates. At the time 822, the intermediate certificate bundle may include a set of earlier CA certificates and a set of new CA certificates.

At a time 824, coinciding with the time 822, the distribution service 802 may send the intermediate certificate bundle to the network entity 806, such as to the update module 808 of the network entity 806. In one example, the distribution service 802 may push the intermediate certificate bundle to the network entity 806 responsive to the intermediate certificate bundle becoming available. Additionally, or in the alternative, at a time 826, the update module 808 may send a request to the distribution service 802, and the distribution service 802 may send the intermediate certificate bundle to the update module 808 responsive to the request. The update module 808 may receive the intermediate certificate bundle responsive to the request, at the time 826.

At a time 828, the update module 808 may validate the intermediate certificate bundle received from the distribution service 802. In one example, the intermediate certificate bundle may be validated according to one or more operations described with reference to FIGS. 9A-9C. Responsive to the intermediate certificate bundle being validated, the update module 808 may install the intermediate certificate bundle at a time 830. Following the intermediate certificate bundle being validated and installed by the update module 808, the network entity 806 may begin utilizing at least some of the CA certificates in the intermediate certificate bundle to authenticate other network entities associated with the virtual cloud network. For example, the network entity 806 may utilize the earlier CA certificates in the intermediate certificate bundle to authenticate other network entities. In one example, the new CA certificates may need to be activated prior to being utilized to authenticate network entities. In one example, the new CA certificates may be activated prior to being added to the intermediate certificate bundle, and/or prior to the intermediate certificate bundle being distributed by the distribution service 802.

Figure 8B:
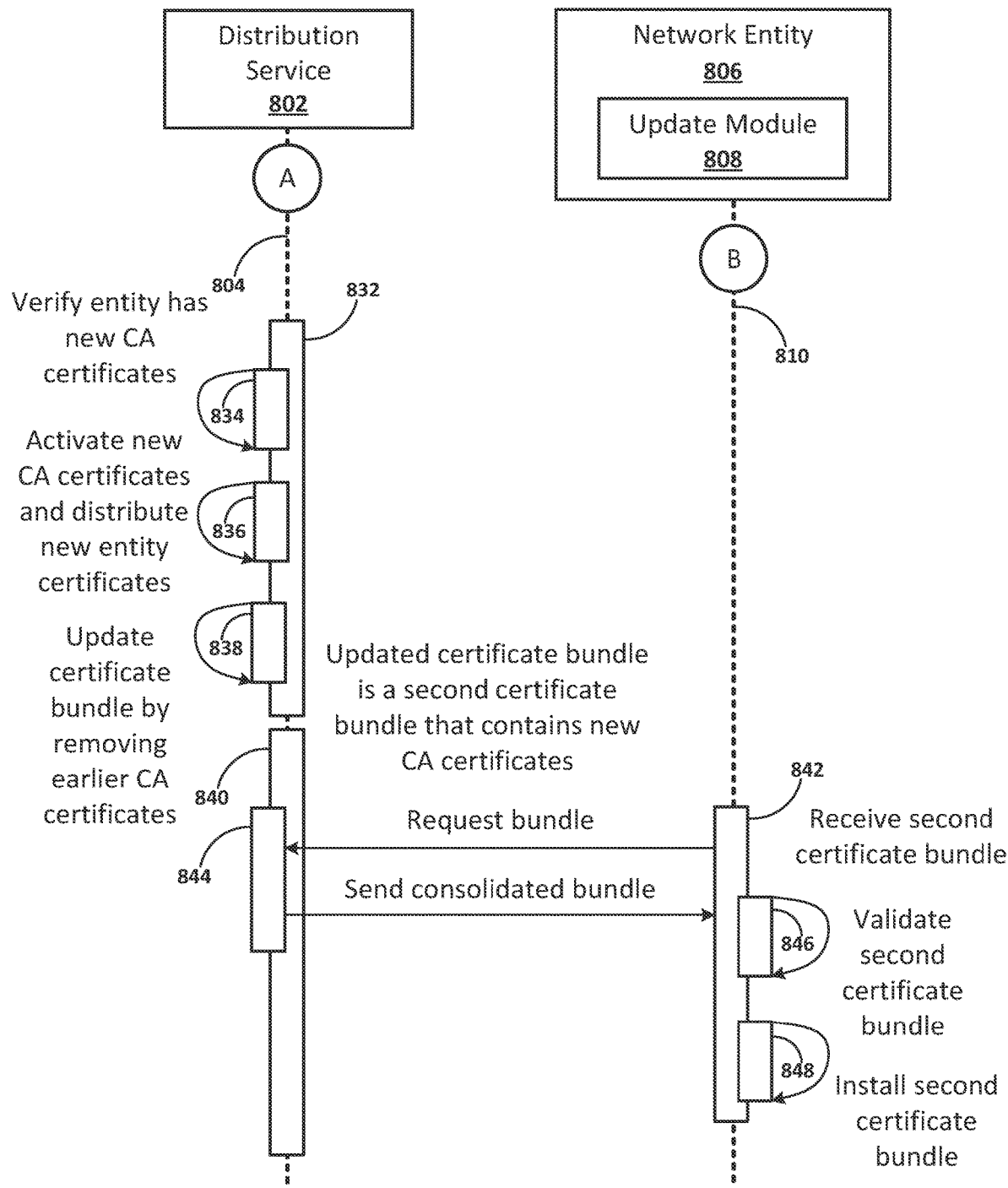

Referring now to FIG. 8B, at a time 832, the distribution service may generate an additional updated certificate bundle, such as a second certificate bundle. The second certificate bundle may reflect an updated from the intermediate certificate bundle distributed by the distribution service. The update from the intermediate certificate bundle to the second certificate bundle may include removing earlier CA certificates. The second certificate bundle may be generated at least by removing earlier CA certificates from the intermediate certificate bundle, or by creating a new certificate bundle that includes the new CA certificates and does not include at least one of the earlier CA certificates. One or more operations performed to remove the earlier CA certificates may sometimes be referred to as consolidating a certificate bundle. In one example, the operations associated with consolidating a certificate bundle may include: verifying a network entity has the new CA certificates distributed in the intermediate certificate bundle, activating the new CA certificates, and removing earlier CA certificates. The earlier CA certificates removed from the certificate bundle may include one or more CA certificates respectively being superseded by a corresponding new CA certificate. All or a portion of the earlier CA certificates may be superseded by a corresponding new CA certificate. In one example, a second certificate bundle may include one or more earlier CA certificates that are not superseded by a new CA certificate. The one or more CA certificates that are not superseded may remain effective following the consolidation of the certificate bundle.

In one example, at a time 834, the distribution service 802 may verify that the network entity 806 has the new CA certificates. The distribution service 802 may perform a verification, or the verification may be determined based on having distributed the intermediate certificate bundle to the network entity. Additionally, or in the alternative, the verification may be based at least in part on a verification message from the network entity 806 and/or a passage of time without having received an error message from the network entity 806.

At a time 836, the distribution service 802 may activate the new CA certificates, for example, as described with reference to block 704 of FIG. 7. Additionally, at a time 836, the distribution service 802 may distribute new entity certificates, for example, as described with reference to block 706 of FIG. 7. In one example, activating a new CA certificate may include a CA corresponding to one or more new root CA certificate issuing one or more intermediate CA certificates. In one example, distributing new entity certificates may include the CA corresponding to the one or more intermediate CA certificates issuing one or more entity certificates for distribution to a corresponding one or more network entities. Additionally, or in the alternative, the CA corresponding to the one or more new root CA certificates may issue one or more entity certificates for distribution to a corresponding one or more network entities. The new root CA certificates may be utilized by the other network entities to authenticate the entity certificates and/or the intermediate CA certificates.

At a time 838, the distribution service 802 may remove earlier CA certificates. Removing the earlier CA certificates may include generating a second certificate bundle that does not include the earlier CA certificates. For example, a second certificate bundle may be defined, and new CA certificates may be added to the second certificate bundle (along with any earlier CA certificates that are not being superseded by a new CA certificate). Additionally, or in the alternative, earlier CA certificates may be deleted from an intermediate certificate bundle that includes the new CA certificates, and the intermediate certificate bundle may thereafter be defined as the second certificate bundle. As a result of removing the earlier CA certificates, at a time 840, the second certificate bundle may include the new CA certificates and any earlier CA certificates that are not being superseded by a new CA certificate.

At a time 842, coinciding with the time 840, the update module 808 may send a request to the distribution service 802 for an updated certificate bundle. The request from the update module 808 may be one of a series of periodic requests. At a time 844, coinciding with the time 840, the distribution service 802 may send the second certificate bundle to the network entity 806, such as to the update module 808 of the network entity 806. The update module 808 may receive the second certificate bundle at the time 842 responsive to the request. Additionally, or in the alternative, the distribution service 802 may push the second certificate bundle to the update module 808 responsive to the second certificate bundle becoming available.

Responsive to receiving the second certificate bundle, at a time 846, the update module 808 may validate the second certificate bundle received from the distribution service 802. In one example, the second certificate bundle may be validated according to one or more operations described with reference to FIGS. 9A-9C. Responsive to the second certificate bundle being validated, the update module 808 may install the second certificate bundle at a time 848. Following the second certificate bundle being validated and installed by the update module 808, the network entity 806 may begin utilizing the CA certificates in the second certificate bundle to authenticate other network entities associated with the virtual cloud network. For example, the new CA certificates may be utilized to authenticate network entities. Additionally, or in the alternative, any earlier CA certificates included in the second certificate bundle, for example, as not having been superseded by a new CA certificate, may be utilized to authenticate network entities.

Figure 8C:
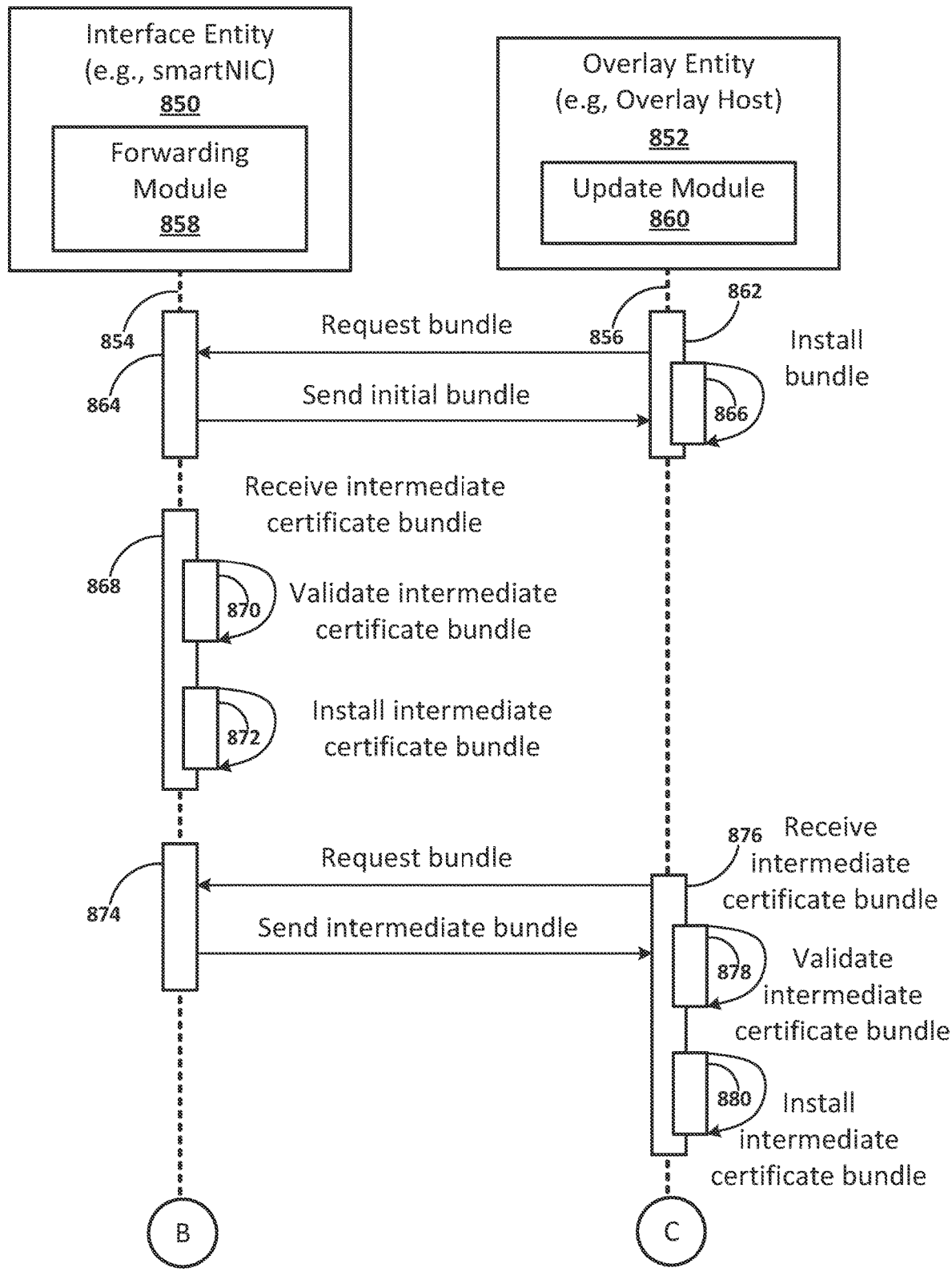
Figure 8D:
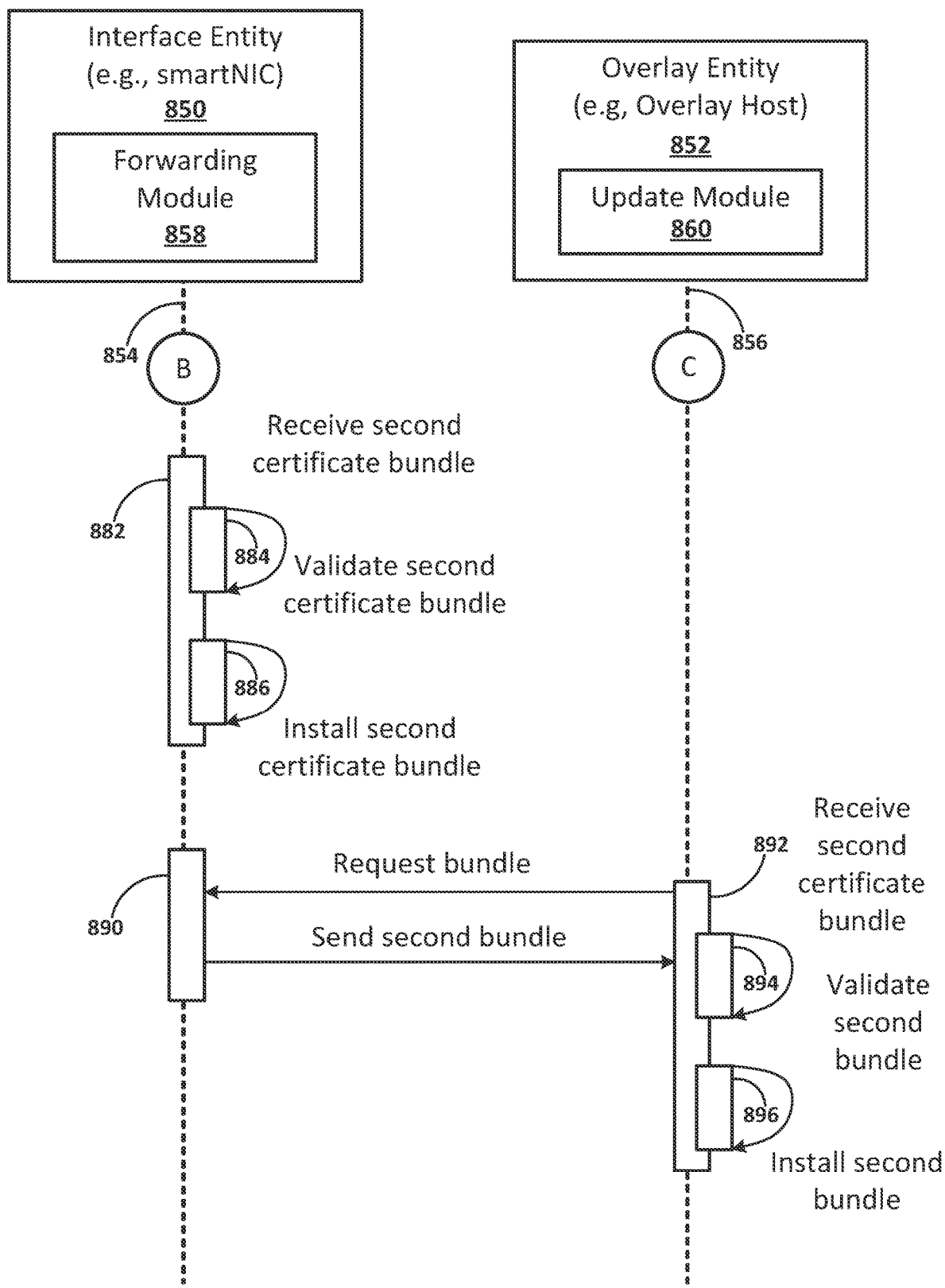

Referring now to FIGS. 8C and 8D, example operations 800 pertaining to distributing certificate bundles are further described. As shown in FIGS. 8A and 8D, certificate bundles distributed to a network entity may be forwarded from the network entity to another network entity. For example, an interface entity 850 may receive certificate bundles from a distribution service as described with reference to FIGS. 8A and 8B. The interface entity 850 described with reference to FIGS. 8C and 8D may be the network entity described with reference to FIGS. 8A and 8B. In one example, the interface entity 850 may be a smartNIC. The interface entity 850 may include a forwarding module 858. The forwarding module may forward certificate bundles to other network entities associated with the virtual cloud network. For example, as shown in FIGS. 8C and 8D, certificate bundles may be forwarded by the interface entity 850, such as by the forwarding module 858 of the interface entity 850, to an overlay entity 806. In one example, the overlay entity 806 may be an overlay host.

The operations 800 may include operations of a forwarding entity, such as the interface entity 850, shown on a forwarding entity timeline 854. Additionally, or in the alternative, the operations 800 may include operations of a receiving entity, such as the overlay entity 852, shown on a receiving entity timeline 856. The forwarding entity, such as the interface entity 850, may include a forwarding module 858. The forwarding module 858 may perform at least a portion of the operations described with reference to the forwarding entity timeline 854. The receiving entity, such as the overlay entity 852, may include an update module 860. The update module 860 may perform at least a portion of the operations described with respect to the receiving entity timeline 856.

Referring to FIG. 8C, at a time 862, the overlay entity 852 may request a certificate bundle. For example, the update module 860 of the overlay entity 852 may send a request for the certificate bundle to the forwarding module 858 of the interface entity 850. At a time 864, the forwarding module 858 may receive the request for the certificate bundle. Responsive to the request, the forwarding module 858 may send the certificate bundle to the overlay entity 852, such as to the update module 860 of the overlay entity 852. At a time 866, the update module 860 may install the certificate bundle. The overlay entity 852 may utilize CA certificates in the certificate bundle to authenticate network entities associated with the virtual cloud network.

The certificate bundle sent to the overlay entity 852 at the time 864 may be an initial certificate bundle, such as the initial certificate bundle distributed to the interface entity at the time 816, as described with reference to FIG. 8A. The forwarding module 858 may forward the certificate bundle to various overlay entities. The overlay entities may utilize the CA certificates in the certificate bundle to validate network entities associated with the virtual cloud network. In one example, the update module 860 of the overlay entity 852 may periodically request for the forwarding module 858 to forward a certificate bundle. The forwarding module 858 may respond to periodic requests by sending a certificate bundle to the update module 860, for example, when an updated certificate bundle is available.

At a time 868, the interface entity 850 may receive an intermediate certificate bundle. The receipt of the intermediate certificate bundle at the time 868 may coincide with the receipt of the intermediate certificate bundle received from the distribution service 802 at the time 826 as described with reference to FIG. 8A. At a time 870, the interface entity 850 may validate the intermediate certificate bundle, for example, according to one or more operations described with reference to FIGS. 9A-9C. Responsive to the intermediate certificate bundle being validated, the interface entity 850 may install the intermediate certificate bundle at a time 872.

At a time 874, the forwarding module 858 may send the intermediate certificate bundle to the overlay entity 852, such as to the update module 860 of the overlay entity 852. In one example, the forwarding module 858 may push the intermediate certificate bundle to the overlay entity 852 responsive to the intermediate certificate bundle being installed by the interface entity 850. Additionally, or in the alternative, at a time 876, the update module 860 may send a request to the forwarding module 858, and the forwarding module 858 may send the intermediate certificate bundle to the update module 860 responsive to the request. The update module 60 may receive the intermediate certificate bundle responsive to the request, at the time 876.

At a time 878, the update module 860 may validate the intermediate certificate bundle received from the forwarding module 858. In one example, the intermediate certificate bundle may be validated according to one or more operations described with reference to FIGS. 9A-9C. Responsive to the intermediate certificate bundle being validated, the update module 860 may install the intermediate certificate bundle at a time 880. Following the intermediate certificate bundle being validated and installed by the update module 860, the interface entity 850 may begin utilizing at least some of the CA certificates in the intermediate certificate bundle to authenticate other network entities associated with the virtual cloud network.

Referring now to FIG. 8D, at a time 882, the interface entity 850 may receive a second certificate bundle. The receipt of the second certificate bundle at the time 882 may coincide with the receipt of the second certificate bundle received from the distribution service 802 at the time 842 as described with reference to FIG. 8B. At a time 884, the interface entity 850 may validate the second certificate bundle, for example, according to one or more operations described with reference to FIGS. 9A-9C. Responsive to the second certificate bundle being validated, the interface entity 850 may install the second certificate bundle at a time 886.

At a time 892, the forwarding module 858 may receive a request for an updated certificate bundle from the update module 860 of the overlay entity 852. The request from the update module 860 may be one of a series of periodic requests. At a time 890, the forwarding module 858 may send the second certificate bundle to the update module 860 of the overlay entity 852. The update module 860 may receive the second certificate bundle at the time 892 responsive to the request to the forwarding module 858. Additionally, or in the alternative, the forwarding module 858 may push the second certificate bundle to the update module 860 responsive to the second certificate bundle being installed by the interface entity 850.

Responsive to receiving the second certificate bundle, at a time 846, at a time 892, the update module 860 may validate the second certificate bundle received from the forwarding module 858. In one example, the second certificate bundle may be validated according to one or more operations described with reference to FIGS. 9A-9C. Responsive to the second certificate bundle being validated, the update module 860 may install the second certificate bundle at a time 896. Following the second certificate bundle being validated and installed by the update module 860, the interface entity 850 may begin utilizing at least some of the CA certificates in the second certificate bundle to authenticate other network entities associated with the virtual cloud network. For example, the new CA certificates may be utilized to authenticate network entities. Additionally, or in the alternative, any CA certificates from the first subset of CA certificates that are included in the second certificate bundle, for example, as not having been superseded by a new CA certificate, may be utilized to authenticate network entities.

B. Distribution Operation Processes

Figure 9A:
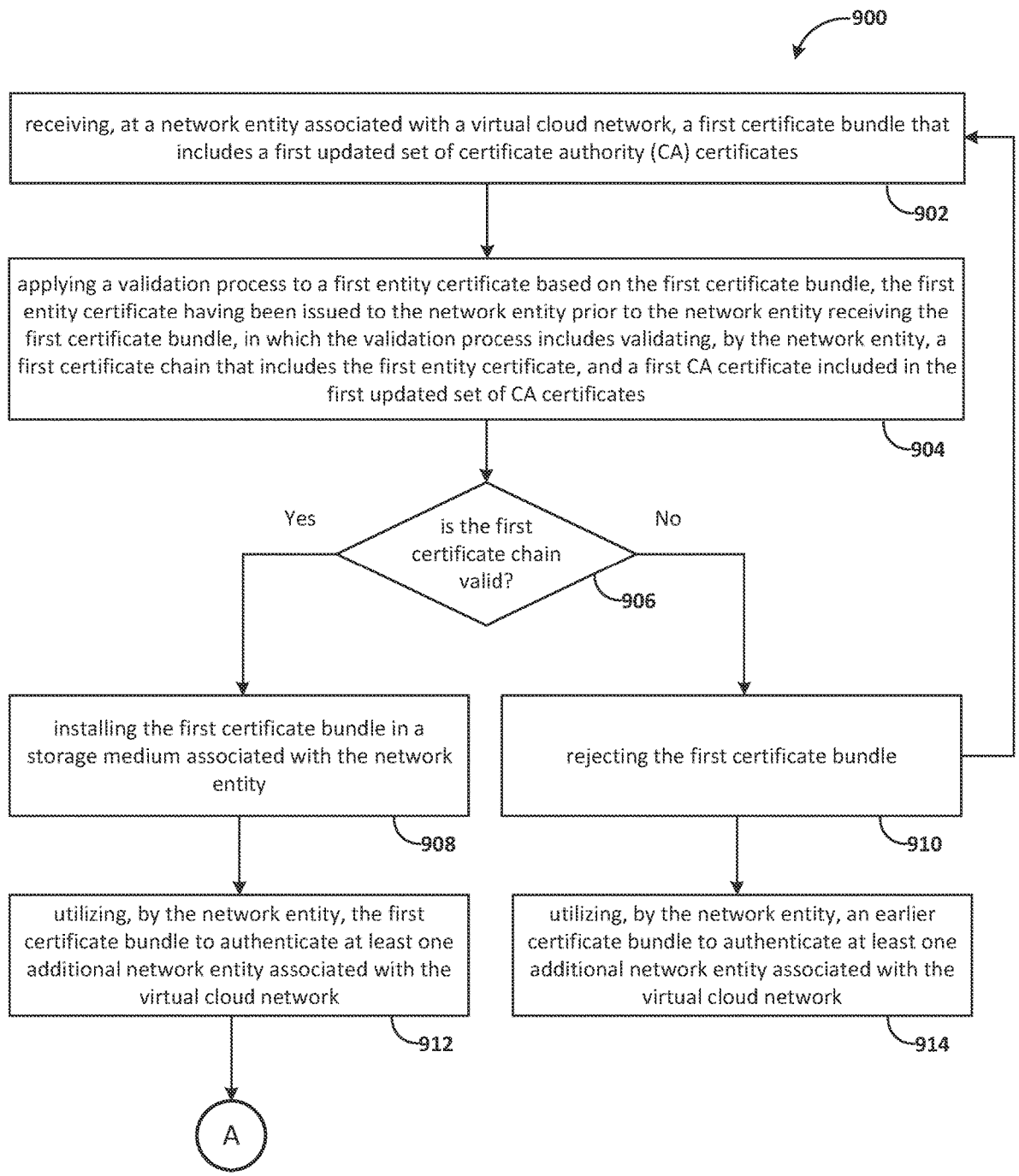
FIGS. 9A-9C are flowcharts that further illustrate example operations pertaining to distributing certificate bundles to network entities associated with a virtual cloud network in accordance with one or more embodiments.
Figure 9B:
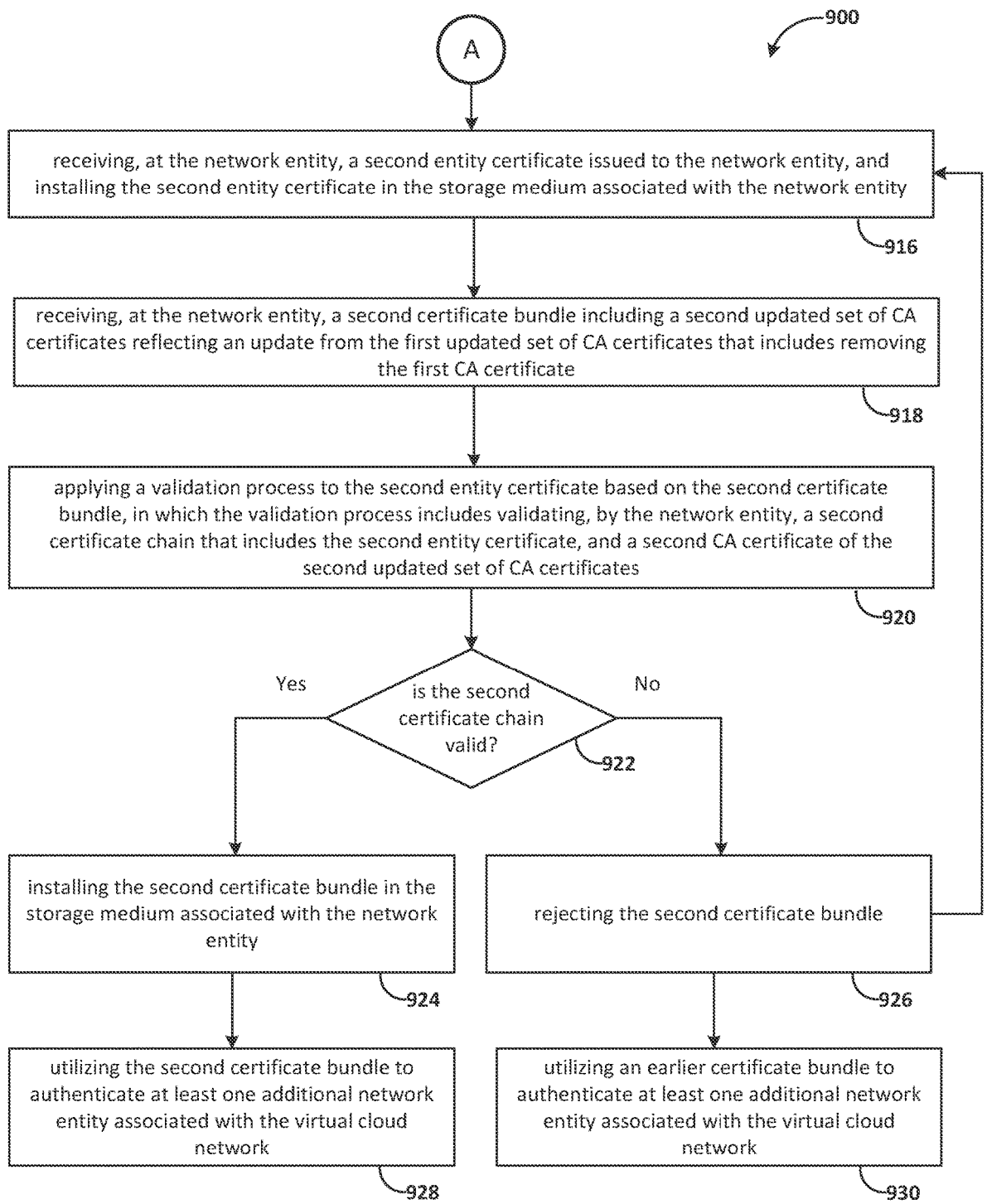
Figure 9C:
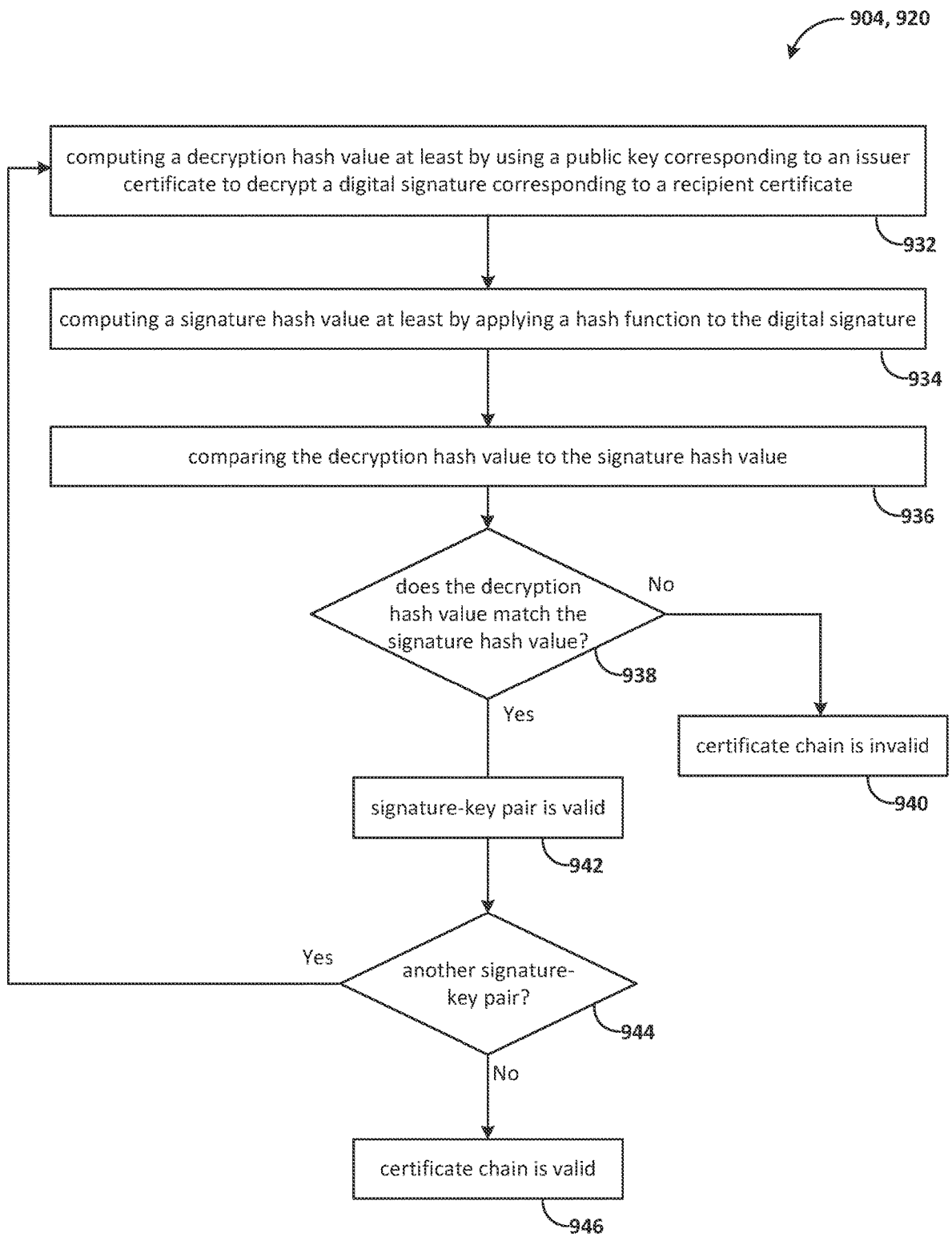

Referring now to FIGS. 9A-9C, operations pertaining to distributing certificate bundles to network entities associated with a virtual cloud network are further described. One or more operations 900 described with reference to FIGS. 9A-9C may be modified, rearranged, or omitted all together. Accordingly, the particular sequence of operations 900 described with reference to FIGS. 9A-9C should not be construed as limiting the scope of one or more embodiments. In one example, the operations 900 described with reference to FIGS. 9A-9C may correspond to Phase 1 and/or Phase 3 of the operations described with reference to FIG. 7. Additionally, or in the alternative, the operations 900 described with reference to FIGS. 9A-9C may correspond to one or more operations described with reference to FIGS. 8A-8D.

Referring to FIGS. 9A-9C, operations 900 associated with a network entity are described. As shown in FIG. 9A, the operations 900 may include, at block 902, receiving, at a network entity associated with a virtual cloud network, a first certificate bundle that includes a first updated set of CA certificates. The network entity may be a substrate entity, an interface entity, or an overlay entity. The first updated set of CA certificates may include earlier CA certificates and new CA certificates. In one example, the first certificate bundle may be transmitted to the network entity in response to an update request made by the network entity.

At block 904, the operations 900 may include applying a validation process to a first entity certificate having been issued to the network entity prior to the network entity receiving the first certificate bundle. The first entity certificate may be received and installed prior to receiving the first certificate bundle. The validation process may include validating, by the network entity, a first certificate chain that includes the first entity certificate, and a first CA certificate included in the first updated set of CA certificates. The first CA certificate may be a earlier CA certificate. The first certificate chain may be validated according to a validation process that includes one or more validation operations including, for example, the validation operations described with reference to FIG. 9C. At block 906, the operations 900 may include determining whether the validation operations at block 904 resulted in a determination that first certificate chain valid. For a determination that the first certificate chain is valid, the operations 900 may proceed to block 908. For a determination that the first certificate chain is invalid, the operations 900 may proceed to block 910.

At block 908, responsive to determining that the first certificate chain is valid, the operations 900 may include installing the first certificate bundle in a storage medium associated with the network entity. Upon having installed the first certificate bundle, the operations 900 may include, at block 912, the network entity utilizing the first certificate bundle to authenticate at least one additional network entity associated with the virtual cloud network. Additionally, or in the alternative, at block 910, the operations 900 may include rejecting the first certificate bundle responsive to determining that the first certificate chain is invalid. Responsive to rejecting the first certificate bundle, the operations 900 may include, at block 914, the network entity utilizing an earlier certificate bundle to authenticate at least one additional network entity associated with the virtual cloud network.

In one example, the operations 900 may include forwarding a certificate bundle to another network entity, such as an overlay entity. The operations 900 may include receiving, at the network entity, a first certificate bundle request from an overlay entity. The first certificate bundle request may be received subsequent to validating the first certificate chain. The network entity may be an interface entity. Responsive to the first certificate bundle request, the operations 900 may include transmitting the first certificate bundle, for example, from the interface entity to the overlay entity. The operations 900 may further include the overlay entity validating a first overlay entity certificate chain that includes a first entity certificate having been issued to the overlay entity, and a CA certificate of the first updated set of CA certificates, such as a earlier CA certificate. In one example, the first entity certificate issued to the overlay entity may be a first instance principal certificate. Responsive to the overlay entity validating the first overlay entity certificate chain, the operations 900 may include installing the first certificate bundle. The operations 900 may further include the overlay entity utilizing the first certificate bundle to authenticate at least one additional entity associated with the virtual cloud network.

In one example, the operations 900 may include transmitting, to the overlay entity, a second entity certificate, such as a second instance principal certificate, issued to the overlay entity. The second instance principal certificate may be transmitted to the overlay entity by the interface entity, for example, subsequent to the interface entity having validated the second certificate chain. The operations 900 may include the overlay entity installing the second instance principal certificate.

Referring now to FIG. 9B, operations 900 associated with a network entity are further described. In one example, the operations described with reference to FIG. 9B may continue from block 912 of FIG. 9A. As shown in FIG. 9B, the operations 900 may include, at block 916, receiving, at the network entity, a second entity certificate issued to the network entity, and installing the second entity certificate in the storage medium associated with the network entity. The second entity certificate may have been issued by a CA corresponding to a new CA certificate in the first certificate bundle distributed to the network entity and installed by the network entity, for example, as described with reference to FIG. 9A. At block 918, the operations 900 may include receiving, at the network entity, a second certificate bundle including a second updated set of CA certificates reflecting an update from the first updated set of CA certificates that includes removing the first CA certificate. The first CA certificate may be a earlier CA certificate. The second updated set of CA certificates may include new CA certificates. Additionally, or in the alternative, the second updated set of CA certificates may include earlier CA certificates that have not been superseded by a new CA certificate in the second certificate bundle. In one example, the second certificate bundle may be transmitted to the network entity in response to an update request made by the network entity.

At block 920, the operations 900 may include applying a validation process to the second entity certificate based on the second certificate bundle. The validation process may include validating, by the network entity, a second certificate chain that includes the second entity certificate, and a second CA certificate of the second updated set of CA certificates. The second CA certificate may be a new CA certificate or an earlier CA certificate that has not been superseded by a new CA certificate in the second certificate bundle. The second certificate chain may be validated according to a validation process that includes one or more validation operations including, for example, the validation operations described with reference to FIG. 9C.

At block 922, the operations 900 may include determining whether the validation operations at block 920 resulted in a determination that second certificate chain valid. For a determination that the second certificate chain is valid, the operations 900 may proceed to block 924. For a determination that the second certificate chain is invalid, the operations 900 may proceed to block 926.

At block 924, responsive to determining that the second certificate chain is valid, the operations 900 may include installing the second certificate bundle in the storage medium associated with the network entity. Upon having installed the second certificate bundle, the operations 900 may include, at block 928, the network entity utilizing the second certificate bundle to authenticate at least one additional network entity associated with the virtual cloud network. Additionally, or in the alternative, at block 926, the operations 900 may include rejecting the fir second certificate bundle responsive to determining that the second certificate chain is invalid. Responsive to rejecting the second certificate bundle, the operations 900 may include, at block 930, the network entity utilizing an earlier certificate bundle to authenticate at least one additional network entity associated with the virtual cloud network. In one example, subsequent to validating the second certificate chain, the operations 900 may include uninstalling the first entity certificate.

In one example, the operations 900 may include receiving, at the interface entity, a second certificate bundle request from the overlay entity. Responsive to the second certificate bundle request, the operations 900 may include transmitting the second certificate bundle, for example, from the interface entity to the overlay entity. The operations 900 may further include the overlay entity validating a second overlay entity certificate chain that includes a second entity certificate, such as a second instance principal certificate, having been issued to the overlay entity, and a CA certificate of the second updated set of CA certificates. Responsive to the overlay entity validating the second overlay entity certificate chain, the operations 900 may include installing the second certificate bundle. The operations 900 may further include uninstalling the first entity certificate, for example, subsequent to validating the second overlay entity certificate chain. The operations 900 may further include the overlay entity utilizing the second certificate bundle to authenticate at least one additional entity associated with the virtual cloud network. In one example, the interface entity may utilize the second certificate bundle to authenticate the overlay entity, and/or the overlay entity utilize the second certificate bundle to authenticate the interface entity.

Referring now to FIG. 9C, example operations 900 associated with a network entity are further described. The operations 900 may include operations associated with validating a certificate chain, such as validating the first certificate chain at block 904 as described with reference to FIG. 9A and/or validating the second certificate chain at block 920 as described with reference to FIG. 9B. The operations shown in FIG. 9C may be repeated for each signature-key pair in the certificate chain. The certificate chain may include a set of signature-key pairs, and each signature-key pair of the set of signature-key pairs may respectively include a public key corresponding to an issuer certificate and a digital signature corresponding to a recipient certificate.

In one example, a certificate chain may include a signature-key pair for a digital signature in an entity certificate and a public key corresponding to a CA certificate of a CA that is the issuer of the entity certificate. In one example, the CA that issued the entity certificate may be a root CA and the CA certificate may be a root CA certificate. In one example, the CA that issued the entity certificate may be an intermediate CA and the CA certificate may be an intermediate CA certificate. Additionally, or in the alternative, a certificate chain may include a signature-key pair for a digital signature in the intermediate CA certificate and a public key corresponding to a CA certificate of a CA this is the issuer of the intermediate CA certificate. In one example, the intermediate CA may be the issuer of the entity certificate, and the root CA may be the issuer of the intermediate CA certificate.

As shown in FIG. 9C, operations 900 for a respective signature-key pair of a certificate chain are described. As shown, the operations 900 may include, at block 932 computing a decryption hash value at least by using a public key corresponding to an issuer certificate to decrypt a digital signature corresponding to a recipient certificate. For one signature-key pair, the issuer certificate may be the CA certificate and the recipient certificate may be the entity certificate. In one example, the CA certificate may be an intermediate CA certificate. For another signature-key pair, the recipient certificate may be the CA certificate, and the issuer certificate may be a higher-level CA certificate. For example, the recipient certificate may be an intermediate CA certificate, and the issuer certificate may be a root CA certificate.

At block 934, the operations 900 may include computing a signature hash value at least by applying a hash function to the digital signature, and at block 936, the operations 900 may include comparing the decryption hash value to the signature hash value. At block 938, the operations may include determining whether the decryption hash value matches the signature hash value. For a decryption hash value that mismatches the signature hash value, the operations may include, at block 940, determining that the certificate chain is invalid. In one example, the certificate chain may be determined invalid at block 940 when the decryption hash value mismatches the signature hash value for any of the signature-key pairs in the certificate chain. For a decryption hash value that matches the signature hash value, the operations 900 may include, at block 942, determining that the signature-key pair is valid. At block 944, the operations 900 may include at block 944, determining whether the certificate chain includes another signature-key pair. For a signature chain that includes another signature-key pair, the operations 900 may return to block 932. For a signature chain that does not include another signature-key pair, the operations 900 may include, at block 946, determining that the certificate chain is valid. The certificate chain may be determined valid when the decryption hash value matches the signature hash value for each of the signature-key pairs.

10. Miscellaneous; Extensions

Embodiments are directed to a system with one or more devices that include a hardware processor and that are configured to perform any of the operations described herein and/or recited in any of the claims below.

Embodiments are directed to a system including means to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Further aspects of the presently disclosed subject matter are provided by the following clauses:

A non-transitory computer readable medium comprising instructions which, when executed by one or more hardware processors, causes performance of operations comprising: distributing, to a plurality of entities associated with a virtual cloud network, a first certificate bundle comprising a first updated set of certificate authority (CA) certificates, the first updated set of CA certificates comprising a first subset of earlier CA certificates and a second subset of new CA certificates; determining a validation indicator indicative of at least a threshold portion of the plurality of entities having (i) validated a certificate chain that includes at least one CA certificate of the first updated set of CA certificates, or (ii) installed the first certificate bundle responsive to having validated the certificate chain, wherein for a first entity of the plurality of entities, the certificate chain comprises a first entity certificate, having been issued to the first entity, and a first CA certificate, wherein the first CA certificate is a earlier CA certificate of the first subset of earlier CA certificates; responsive to determining the validation indicator: activating one or more new CA certificates of the second subset of new CA certificates; generating a second certificate bundle reflecting an update from the first certificate bundle, wherein the update comprises removing the first subset of earlier CA certificates, and wherein the second certificate bundle comprises a second updated set of CA certificates including the second subset of new CA certificates; and distributing, to the plurality of entities, the second certificate bundle comprising the second updated set of CA certificates.

The medium of any clause herein, wherein the validation indicator comprises at least one of: a time period having elapsed; a notification from or representing the threshold portion of the plurality of entities; or an update request from or representing the threshold portion of the plurality of entities.

The medium of any clause herein, wherein the operations further comprise: receiving, from the first entity, a first update request; wherein distributing the first certificate bundle to the plurality of entities comprises transmitting the first certificate bundle to the first entity responsive to the first update request.

The medium of any clause herein, wherein the operations further comprise: receiving, from the first entity, a second update request; wherein distributing the second certificate bundle to the plurality of entities comprises transmitting the second certificate bundle to the first entity responsive to the second update request.

The medium of any clause herein, wherein the operations further comprise: subsequent to distributing the first certificate bundle, distributing, to the first entity, a second entity certificate issued to the first entity; prior to distributing the second certificate bundle, determining an install indicator indicative of the first entity having installed the second entity certificate in an entity storage medium associated with the first entity.

The medium of any clause herein, wherein the install indicator comprises at least one of: a time period having elapsed; a notification from the first entity; or an update request.

A non-transitory computer readable medium comprising instructions which, when executed by one or more hardware processors, causes performance of operations comprising: receiving, at a first entity associated with a virtual cloud network, a first certificate bundle comprising a first updated set of certificate authority (CA) certificates and a first current set of CA certificates; installing the first certificate bundle in a first storage medium associated with the first entity, and utilizing, by the first entity, the first certificate bundle to authenticate at least a second entity associated with the virtual cloud network; receiving, at the first entity, a second entity certificate issued to the first entity, and installing the second entity certificate in the first storage medium associated with the first entity; receiving, at the first entity, a second certificate bundle comprising the first updated set of CA certificates and not comprising the first current set of CA certificates; installing the second certificate bundle in the first storage medium associated with the first entity, and utilizing the second certificate bundle to authenticate at least a third entity associated with the virtual cloud network.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

All references, including publications, patent applications, and patents, cited herein are hereby incorporated by reference to the same extent as if each reference were individually and specifically indicated to be incorporated by reference and were set forth in its entirety herein.

What is claimed is:

1. A non-transitory computer readable medium comprising instructions which, when executed by one or more hardware processors, causes performance of operations comprising:
receiving, at a first entity associated with a virtual cloud network, a first certificate bundle comprising a first updated set of certificate authority (CA) certificates;
applying a validation process to a first entity certificate based on the first certificate bundle, the first entity certificate being issued to the first entity prior to the first entity receiving the first certificate bundle, wherein the validation process comprises:

validating, by the first entity, a first certificate chain comprising the first entity certificate, and a first CA certificate included in the first updated set of CA certificates;

responsive to validating the first certificate chain, installing the first certificate bundle in a first storage medium associated with the first entity, and utilizing, by the first entity, the first certificate bundle to authenticate at least one additional entity associated with the virtual cloud network.

2. The medium of claim 1, wherein validating the first certificate chain comprises validating a set of signature-key pairs;

wherein each signature-key pair, of the set of signature-key pairs, respectively comprises a public key corresponding to an issuer certificate and a digital signature corresponding to a recipient certificate;

wherein validating the set of signature-key pairs comprises:

for a respective signature-key pair of the set of signature-key pairs:
(a) computing a decryption hash value at least by using the public key to decrypt the digital signature,
(b) computing a signature hash value at least by applying a hash function to the digital signature,
(c) comparing the decryption hash value to the signature hash value, and
(d) determining a match between the decryption hash value and the signature hash value, and repeating elements (a), (b), (c), and (d) for each signature-key pair of the set of signature-key pairs;

wherein for at least one signature-key pair of the set of signature-key pairs, the recipient certificate is the first entity certificate, and wherein for at least one signature-key pair of the set of signature-key pairs, the issuer certificate is the first CA certificate from among the updated set of CA certificates.

3. The medium of claim 2, wherein the set of signature-key pairs comprises a first signature-key pair and a second signature-key pair;

wherein for the first signature-key pair, the recipient certificate is the first entity certificate and the issuer certificate is a first intermediate CA certificate; and wherein for the second signature-key pair, the recipient certificate is the first intermediate CA certificate, and the issuer certificate is one of: a first root CA certificate or a second intermediate CA certificate.

4. The medium of claim 3, wherein the set of signature-key pairs comprises the first signature-key pair, the second signature-key pair, and a third signature-key pair;

wherein for the second signature-key pair, the issuer certificate is the second intermediate CA certificate; and wherein for the third signature-key pair, the recipient certificate is the second intermediate CA certificate, and the issuer certificate is the first CA certificate.

5. The medium of claim 1, wherein the operations further comprise:

subsequent to validating the first certificate chain, receiving, at the first entity, a second entity certificate issued to the first entity, and installing the second entity certificate in the first storage medium associated with the first entity;

receiving, at the first entity, a second certificate bundle comprising a second updated set of CA certificates, the second updated set of CA certificates reflecting an update from the first updated set of CA certificates, wherein the update comprises removing the first CA certificate;

validating, by the first entity, a second certificate chain, wherein the second certificate chain comprises the second entity certificate, and a second CA certificate of the second updated set of CA certificates;

responsive to validating the second certificate chain, installing the second certificate bundle in the first storage medium associated with the first entity, and utilizing the second certificate bundle to authenticate at least one additional entity associated with the virtual cloud network.

6. The medium of claim 5, wherein validating the second certificate chain comprises validating a set of signature-key pairs;

wherein each signature-key pair, of the set of signature-key pairs, respectively comprises a public key corresponding to an issuer certificate and a digital signature corresponding to a recipient certificate;

wherein validating the set of signature-key pairs comprises:

for a respective signature-key pair of the set of signature-key pairs:
(a) computing a decryption hash value at least by using the public key to decrypt the digital signature,
(b) computing a signature hash value at least by applying a hash function to the digital signature,
(c) comparing the decryption hash value to the signature hash value, and
(d) determining a match between the decryption hash value and the signature hash value, and repeating elements (a), (b), (c), and (d) for each signature-key pair of the set of signature-key pairs;

wherein for at least one signature-key pair of the set of signature-key pairs, the recipient certificate is the first entity certificate, and wherein for at least one signature-key pair of the set of signature-key pairs, the issuer certificate is the second CA certificate from among the second updated set of CA certificates.

7. The medium of claim 6, wherein the operations further comprise:

transmitting, to a certificate bundle distribution service, a first update request;

receiving the first certificate bundle comprising the first updated set of CA certificates in response to the first update request;

subsequent to validating the first certificate chain, transmitting, to the certificate bundle distribution service, a second update request; and receiving the second certificate bundle comprising the second updated set of CA certificates in response to the second update request.

8. The medium of claim 6, wherein the operations further comprise:

subsequent to validating the second certificate chain, uninstalling the first entity certificate from the first storage medium associated with the first entity.

9. The medium of claim 1, wherein the operations further comprise:

prior to receiving the first certificate bundle, receiving, at the first entity, the first entity certificate, and installing the first entity certificate in the first storage medium associated with the first entity.

10. The medium of claim 1,
wherein the first certificate chain comprises one or more signature-key pairs, wherein each signature-key pair of the one or more signature-key pairs respectively comprises a public key and a digital signature, and
wherein validating the first certificate chain comprises, for each signature-key pair of the one or more signature-key pairs:
  computing a decryption hash value at least by decrypting the digital signature of the signature-key pair with the public key of the signature-key pair;
  computing a signature hash value at least by applying a hash function to the digital signature of the signature-key pair;
  comparing the decryption hash value to the signature hash value;
  determining a match between the decryption hash value and the signature hash value; and
  designating the first certificate chain as valid based at least in part on having determined the match between the decryption hash value and the signature hash value for each signature-key pair of the one or more signature-key pairs.

11. The medium of claim 10, wherein the one or more signature-key pairs comprises:
  an intermediate signature-key pair comprising an intermediate public key and an intermediate digital signature of an intermediate CA, the intermediate public key corresponding to an intermediate CA certificate, and the first entity certificate including the intermediate digital signature of the intermediate CA; and
  a root signature-key pair comprising a root public key and a root digital signature of a root CA, the root public key corresponding to the first CA certificate, and the intermediate CA certificate including the root digital signature of the root CA.

12. The medium of claim 10, wherein the one or more signature-key pairs comprises:
  a root signature-key pair comprising a root public key and a root digital signature of a root CA, the root public key corresponding to the first CA certificate, and the first entity certificate including the root digital signature of the root CA.

13. The medium of claim 1, wherein the operations further comprise:
  receiving, at a second entity associated with the virtual cloud network, a second certificate bundle comprising a second updated set of CA certificates;
  determining that a second certificate chain is invalid, wherein the second certificate chain comprises a second entity certificate, having been issued to the second entity, and at least one second CA certificate of the second updated set of CA certificates;
  responsive to determining that the second certificate chain is invalid, rejecting the second certificate bundle, and utilizing an earlier certificate bundle to authenticate at least one additional entity associated with the virtual cloud network.

14. The medium of claim 1, wherein the operations further comprise:
  subsequent to validating the first certificate chain, receiving, at the first entity, a first certificate bundle request from an overlay entity associated with the virtual cloud network, the virtual cloud network comprising a substrate network and an overlay network, wherein the overlay entity resides on the overlay network, and wherein the first entity comprises an interface entity that provides a communication interface between the substrate network and the overlay entity;
  responsive to the first certificate bundle request, transmitting from the interface entity to the overlay entity, the first certificate bundle comprising the first updated set of CA certificates;
  validating, by the overlay entity, a second certificate chain, wherein the second certificate chain comprises a first instance principal certificate, having been issued to the overlay entity, and a second CA certificate of the first updated set of CA certificates;
  responsive to validating the second certificate chain, installing the first certificate bundle in a second storage medium associated with the overlay entity, and utilizing, by the overlay entity, the first certificate bundle to authenticate at least one additional entity associated with the virtual cloud network.

15. The medium of claim 14, wherein the operations further comprise:
  subsequent to validating the second certificate chain, receiving, at the overlay entity, a second instance principal certificate issued to the overlay entity, and installing the second instance principal certificate in the second storage medium associated with the overlay entity;
  receiving, at the first entity, a second certificate bundle request from the overlay entity;
  responsive to the second certificate bundle request, transmitting from the interface entity to the overlay entity, a second certificate bundle comprising a second updated set of CA certificates, the second updated set of CA certificates reflecting an update from the first updated set of CA certificates, wherein the update comprises removing the first certificate;
  validating a third certificate chain, wherein the third certificate chain comprises the second instance principal certificate, and a third CA certificate of the second updated set of CA certificates;
  responsive to validating the third certificate chain, installing the second certificate bundle in the second storage medium associated with the overlay entity, and utilizing the second certificate bundle to authenticate at least one additional entity associated with the virtual cloud network.

16. The medium of claim 15, wherein the operations further comprise:
  subsequent to validating the third certificate chain, uninstalling the first instance principal certificate from the second storage medium associated with the overlay entity.

17. The medium of claim 15, wherein the operations further comprise at least one of:
  the first entity utilizing the second certificate bundle to authenticate the overlay entity; or
  the overlay entity utilizing the second certificate bundle to authenticate the first entity.

18. The medium of claim 1, wherein the operations further comprise:
  receiving, at a substrate entity associated with the virtual cloud network, the first certificate bundle comprising the first updated set of CA certificates;
  validating, by the substrate entity, a second certificate chain, wherein the second certificate chain comprises a first service principal certificate, having been issued to the substrate entity, and a second CA certificate of the first updated set of CA certificates;

responsive to validating the second certificate chain, installing the first certificate bundle in a second storage medium associated with the substrate entity, and utilizing, by the substrate entity, the first certificate bundle to authenticate at least one additional entity associated with the virtual cloud network.

19. The medium of claim 18, wherein the operations further comprise:
subsequent to validating the second certificate chain, receiving, at the substrate entity, a second service principal certificate issued to the substrate entity, and installing the second service principal certificate in the second storage medium associated with the substrate entity;
receiving, at the substrate entity, a second certificate bundle comprising a second updated set of CA certificates, the second updated set of CA certificates reflecting an update from the first updated set of CA certificates, wherein the update comprises removing the second CA certificate;
validating a third certificate chain, wherein the third certificate chain comprises the second service principal certificate, and a third CA certificate of the second updated set of CA certificates;
responsive to validating the third certificate chain, installing the second certificate bundle in the second storage medium associated with the substrate entity, and utilizing the second certificate bundle to authenticate at least one additional entity associated with the virtual cloud network.

20. The medium of claim 19, wherein the operations further comprise:
subsequent to validating the third certificate chain, uninstalling the first service principal certificate from the second storage medium associated with the substrate entity.

21. The medium of claim 19, wherein the operations further comprise at least one of:
the first entity utilizing the second certificate bundle to authenticate the substrate entity; or
the substrate entity utilizing the second certificate bundle to authenticate the first entity.

22. The medium of claim 1, wherein the first updated set of CA certificates further comprises a second CA certificate, wherein the first CA certificate is a prior CA certificate and the second CA certificate is a subsequent CA certificate.

23. The medium of claim 22, wherein the first CA certificate is issued by a first CA certificate authority, and the second CA certificate is issued by a second CA certificate authority.

24. The medium of claim 1, wherein the first entity comprises one of:
a substrate entity, an overlay entity, or an interface entity.

25. A method, comprising:
receiving, at a first entity associated with a virtual cloud network, a first certificate bundle comprising a first updated set of certificate authority (CA) certificates;
applying a validation process to a first entity certificate based on the first certificate bundle, the first entity certificate being issued to the first entity prior to the first entity receiving the first certificate bundle, wherein the validation process comprises:
validating, by the first entity, a first certificate chain comprising the first entity certificate, having been issued to the first entity, and a first CA certificate included in the first updated set of CA certificates;
responsive to validating the first certificate chain, installing the first certificate bundle in a first storage medium associated with the first entity, and utilizing, by the first entity, the first certificate bundle to authenticate at least one additional entity associated with the virtual cloud network;
wherein the method is performed using at least one hardware device.

26. A system, comprising:
at least one hardware processor;
the system being configured to execute operations, using the at least one hardware processor, the operations comprising:
receiving, at a first entity associated with a virtual cloud network, a first certificate bundle comprising a first updated set of certificate authority (CA) certificates;
applying a validation process to a first entity certificate based on the first certificate bundle, the first entity certificate being issued to the first entity prior to the first entity receiving the first certificate bundle, wherein the validation process comprises:
validating, by the first entity, a first certificate chain comprising the first entity certificate, having been issued to the first entity, and a first CA certificate included in the first updated set of CA certificates;
responsive to validating the first certificate chain, installing the first certificate bundle in a first storage medium associated with the first entity, and utilizing, by the first entity, the first certificate bundle to authenticate at least one additional entity associated with the virtual cloud network.

27. The system of claim 26,
wherein validating the first certificate chain comprises validating a set of signature-key pairs;
wherein each signature-key pair, of the set of signature-key pairs, respectively comprises a public key corresponding to an issuer certificate and a digital signature corresponding to a recipient certificate;
wherein validating the set of signature-key pairs comprises:
for a respective signature-key pair of the set of signature-key pairs:
(a) computing a decryption hash value at least by using the public key to decrypt the digital signature,
(b) computing a signature hash value at least by applying a hash function to the digital signature,
(c) comparing the decryption hash value to the signature hash value, and
(d) determining a match between the decryption hash value and the signature hash value, and
repeating elements (a), (b), (c), and (d) for each signature-key pair of the set of signature-key pairs;
wherein for at least one signature-key pair of the set of signature-key pairs, the recipient certificate is the first entity certificate, and wherein for at least one signature-key pair of the set of signature-key pairs, the issuer certificate is the first CA certificate from among the updated set of CA certificates.

28. The system of claim 27,
wherein the set of signature-key pairs comprises a first signature-key pair and a second signature-key pair;
wherein for the first signature-key pair, the recipient certificate is the first entity certificate and the issuer certificate is a first intermediate CA certificate; and
wherein for the second signature-key pair, the recipient certificate is the first intermediate CA certificate, and the issuer certificate is one of: a first root CA certificate or a second intermediate CA certificate.

29. The system of claim 28,
wherein the set of signature-key pairs comprises the first signature-key pair, the second signature-key pair, and a third signature-key pair;
wherein for the second signature-key pair, the issuer certificate is the second intermediate CA certificate; and
wherein for the third signature-key pair, the recipient certificate is the second intermediate CA certificate, and the issuer certificate is the first CA certificate.

30. The system of claim 26, wherein the operations further comprise:
subsequent to validating the first certificate chain, receiving, at the first entity, a second entity certificate issued to the first entity, and installing the second entity certificate in the first storage medium associated with the first entity;
receiving, at the first entity, a second certificate bundle comprising a second updated set of CA certificates, the second updated set of CA certificates reflecting an update from the first updated set of CA certificates, wherein the update comprises removing the first CA certificate;
validating, by the first entity, a second certificate chain, wherein the second certificate chain comprises the second entity certificate, and a second CA certificate of the second updated set of CA certificates;
responsive to validating the second certificate chain, installing the second certificate bundle in the first storage medium associated with the first entity, and utilizing the second certificate bundle to authenticate at least one additional entity associated with the virtual cloud network.

31. The system of claim 30,
wherein validating the second certificate chain comprises validating a set of signature-key pairs;
wherein each signature-key pair, of the set of signature-key pairs, respectively comprises a public key corresponding to an issuer certificate and a digital signature corresponding to a recipient certificate;
wherein validating the set of signature-key pairs comprises:
for a respective signature-key pair of the set of signature-key pairs:
(a) computing a decryption hash value at least by using the public key to decrypt the digital signature,
(b) computing a signature hash value at least by applying a hash function to the digital signature,
(c) comparing the decryption hash value to the signature hash value, and
(d) determining a match between the decryption hash value and the signature hash value, and
repeating elements (a), (b), (c), and (d) for each signature-key pair of the set of signature-key pairs;
wherein for at least one signature-key pair of the set of signature-key pairs, the recipient certificate is the first entity certificate, and wherein for at least one signature-key pair of the set of signature-key pairs, the issuer certificate is a second CA certificate from among the set of CA certificates.

32. The system of claim 31, wherein the operations further comprise:
transmitting, to a certificate bundle distribution service, a first update request;
receiving the first certificate bundle comprising the first updated set of CA certificates in response to the first update request;
subsequent to validating the first certificate chain, transmitting, to the certificate bundle distribution service, a second update request; and
receiving the second certificate bundle comprising the second updated set of CA certificates in response to the second update request.

33. The system of claim 31, wherein the operations further comprise:
subsequent to validating the second certificate chain, uninstalling the first entity certificate from the first storage medium associated with the first entity.

34. The system of claim 26, wherein the operations further comprise:
prior to receiving the first certificate bundle, receiving, at the first entity, the first entity certificate, and installing the first entity certificate in the first storage medium associated with the first entity.

35. The system of claim 26,
wherein the first certificate chain comprises one or more signature-key pairs, wherein each signature-key pair of the one or more signature-key pairs respectively comprises a public key and a digital signature, and
wherein validating the first certificate chain comprises, for each signature-key pair of the one or more signature-key pairs:
computing a decryption hash value at least by decrypting the digital signature of the signature-key pair with the public key of the signature-key pair;
computing a signature hash value at least by applying a hash function to the digital signature of the signature-key pair;
comparing the decryption hash value to the signature hash value;
determining a match between the decryption hash value and the signature hash value; and
designating the first certificate chain as valid based at least in part on having determined the match between the decryption hash value and the signature hash value for each signature-key pair of the one or more signature-key pairs.

36. The system of claim 35, wherein the one or more signature-key pairs comprises:
an intermediate signature-key pair comprising an intermediate public key and an intermediate digital signature of an intermediate CA, the intermediate public key corresponding to an intermediate CA certificate, and the first entity certificate including the intermediate digital signature of the intermediate CA; and
a root signature-key pair comprising a root public key and a root digital signature of a root CA, the root public key corresponding to the first CA certificate, and the intermediate CA certificate including the root digital signature of the root CA.

37. The system of claim 35, wherein the one or more signature-key pairs comprises:
a root signature-key pair comprising a root public key and a root digital signature of a root CA, the root public key corresponding to the first CA certificate, and the first entity certificate including the root digital signature of the root CA.

38. The system of claim 26, wherein the operations further comprise:
receiving, at a second entity associated with the virtual cloud network, a second certificate bundle comprising a second updated set of CA certificates;
determining that a second certificate chain is invalid, wherein the second certificate chain comprises a second entity certificate, having been issued to the second entity, and at least one second CA certificate of the second updated set of CA certificates;
responsive to determining that the second certificate chain is invalid, rejecting the second certificate bundle, and utilizing an earlier certificate bundle to authenticate at least one additional entity associated with the virtual cloud network.

39. The system of claim 26, wherein the operations further comprise:
subsequent to validating the first certificate chain, receiving, at the first entity, a first certificate bundle request from an overlay entity associated with the virtual cloud network, the virtual cloud network comprising a substrate network and an overlay network, wherein the overlay entity resides on the overlay network, and wherein the first entity comprises an interface entity that provides a communication interface between the substrate network and the overlay entity;
responsive to the first certificate bundle request, transmitting from the interface entity to the overlay entity, the first certificate bundle comprising the first updated set of CA certificates;
validating, by the overlay entity, a second certificate chain, wherein the second certificate chain comprises a first instance principal certificate, having been issued to the overlay entity, and a second CA certificate of the first updated set of CA certificates;
responsive to validating the second certificate chain, installing the first certificate bundle in a second storage medium associated with the overlay entity, and utilizing, by the overlay entity, the first certificate bundle to authenticate at least one additional entity associated with the virtual cloud network.

40. The system of claim 39, wherein the operations further comprise:
subsequent to validating the second certificate chain, receiving, at the overlay entity, a second instance principal certificate issued to the overlay entity, and installing the second instance principal certificate in the second storage medium associated with the overlay entity;
receiving, at the first entity, a second certificate bundle request from the overlay entity;
responsive to the second certificate bundle request, transmitting from the interface entity to the overlay entity, a second certificate bundle comprising a second updated set of CA certificates, the second updated set of CA certificates reflecting an update from the first updated set of CA certificates, wherein the update comprises removing the first certificate;
validating a third certificate chain, wherein the third certificate chain comprises the second instance principal certificate, and a third CA certificate of the second updated set of CA certificates;
responsive to validating the third certificate chain, installing the second certificate bundle in the second storage medium associated with the overlay entity, and utilizing the second certificate bundle to authenticate at least one additional entity associated with the virtual cloud network.

41. The system of claim 40, wherein the operations further comprise:
subsequent to validating the third certificate chain, uninstalling the first instance principal certificate from the second storage medium associated with the overlay entity.

42. The system of claim 40, wherein the operations further comprise at least one of:
the first entity utilizing the second certificate bundle to authenticate the overlay entity; or
the overlay entity utilizing the second certificate bundle to authenticate the first entity.

43. The system of claim 26, wherein the operations further comprise:
receiving, at a substrate entity associated with the virtual cloud network, the first certificate bundle comprising the first updated set of CA certificates;
validating, by the substrate entity, a second certificate chain, wherein the second certificate chain comprises a first service principal certificate, having been issued to the substrate entity, and a second CA certificate of the first updated set of CA certificates;
responsive to validating the second certificate chain, installing the first certificate bundle in a second storage medium associated with the substrate entity, and utilizing, by the substrate entity, the first certificate bundle to authenticate at least one additional entity associated with the virtual cloud network.

44. The system of claim 43, wherein the operations further comprise:
subsequent to validating the second certificate chain, receiving, at the substrate entity, a second service principal certificate issued to the substrate entity, and installing the second service principal certificate in the second storage medium associated with the substrate entity;
receiving, at the substrate entity, a second certificate bundle comprising a second updated set of CA certificates, the second updated set of CA certificates reflecting an update from the first updated set of CA certificates, wherein the update comprises removing the second CA certificate;
validating a third certificate chain, wherein the third certificate chain comprises the second service principal certificate, and a third CA certificate of the second updated set of CA certificates;
responsive to validating the third certificate chain, installing the second certificate bundle in the second storage medium associated with the substrate entity, and utilizing the second certificate bundle to authenticate at least one additional entity associated with the virtual cloud network.

45. The system of claim 44, wherein the operations further comprise:
subsequent to validating the third certificate chain, uninstalling the first service principal certificate from the second storage medium associated with the substrate entity.

46. The system of claim 44, wherein the operations further comprise at least one of:
the first entity utilizing the second certificate bundle to authenticate the substrate entity; or
the substrate entity utilizing the second certificate bundle to authenticate the first entity.

47. The system of claim 26, wherein the first updated set of CA certificates further comprises a second CA certificate, wherein the first CA certificate is a prior CA certificate and the second CA certificate is a subsequent CA certificate.

48. The system of claim 47, wherein the first CA certificate is issued by a first CA certificate authority, and the second CA certificate is issued by a second CA certificate authority.

49. The system of claim 26, wherein the first entity comprises one of: a substrate entity, an overlay entity, or an interface entity.

50. The method of claim 25,
wherein validating the first certificate chain comprises validating a set of signature-key pairs;
wherein each signature-key pair, of the set of signature-key pairs, respectively comprises a public key corresponding to an issuer certificate and a digital signature corresponding to a recipient certificate;
wherein validating the set of signature-key pairs comprises:
for a respective signature-key pair of the set of signature-key pairs:
(a) computing a decryption hash value at least by using the public key to decrypt the digital signature,
(b) computing a signature hash value at least by applying a hash function to the digital signature,
(c) comparing the decryption hash value to the signature hash value, and
(d) determining a match between the decryption hash value and the signature hash value, and
repeating elements (a), (b), (c), and (d) for each signature-key pair of the set of signature-key pairs;
wherein for at least one signature-key pair of the set of signature-key pairs, the recipient certificate is the first entity certificate, and wherein for at least one signature-key pair of the set of signature-key pairs, the issuer certificate is the first CA certificate from among the updated set of CA certificates.

51. The method of claim 50,
wherein the set of signature-key pairs comprises a first signature-key pair and a second signature-key pair;
wherein for the first signature-key pair, the recipient certificate is the first entity certificate and the issuer certificate is a first intermediate CA certificate; and
wherein for the second signature-key pair, the recipient certificate is the first intermediate CA certificate, and the issuer certificate is one of: a first root CA certificate or a second intermediate CA certificate.

52. The method of claim 51,
wherein the set of signature-key pairs comprises the first signature-key pair, the second signature-key pair, and a third signature-key pair;
wherein for the second signature-key pair, the issuer certificate is the second intermediate CA certificate; and
wherein for the third signature-key pair, the recipient certificate is the second intermediate CA certificate, and the issuer certificate is the first CA certificate.

53. The method of claim 25, further comprising:
subsequent to validating the first certificate chain, receiving, at the first entity, a second entity certificate issued to the first entity, and installing the second entity certificate in the first storage medium associated with the first entity;
receiving, at the first entity, a second certificate bundle comprising a second updated set of CA certificates, the second updated set of CA certificates reflecting an update from the first updated set of CA certificates, wherein the update comprises removing the first CA certificate;
validating, by the first entity, a second certificate chain, wherein the second certificate chain comprises the second entity certificate, and a second CA certificate of the second updated set of CA certificates;
responsive to validating the second certificate chain, installing the second certificate bundle in the first storage medium associated with the first entity, and utilizing the second certificate bundle to authenticate at least one additional entity associated with the virtual cloud network.

54. The method of claim 53,
wherein validating the second certificate chain comprises validating a set of signature-key pairs;
wherein each signature-key pair, of the set of signature-key pairs, respectively comprises a public key corresponding to an issuer certificate and a digital signature corresponding to a recipient certificate;
wherein validating the set of signature-key pairs comprises:
for a respective signature-key pair of the set of signature-key pairs:
(a) computing a decryption hash value at least by using the public key to decrypt the digital signature,
(b) computing a signature hash value at least by applying a hash function to the digital signature,
(c) comparing the decryption hash value to the signature hash value, and
(d) determining a match between the decryption hash value and the signature hash value, and
repeating elements (a), (b), (c), and (d) for each signature-key pair of the set of signature-key pairs;
wherein for at least one signature-key pair of the set of signature-key pairs, the recipient certificate is the first entity certificate, and wherein for at least one signature-key pair of the set of signature-key pairs, the issuer certificate is a second CA certificate from among the set of CA certificates.

55. The method of claim 54, further comprising:
transmitting, to a certificate bundle distribution service, a first update request;
receiving the first certificate bundle comprising the first updated set of CA certificates in response to the first update request;
subsequent to validating the first certificate chain, transmitting, to the certificate bundle distribution service, a second update request; and
receiving the second certificate bundle comprising the second updated set of CA certificates in response to the second update request.

56. The method of claim 54, further comprising:
subsequent to validating the second certificate chain, uninstalling the first entity certificate from the first storage medium associated with the first entity.

57. The method of claim 25, further comprising:
prior to receiving the first certificate bundle, receiving, at the first entity, the first entity certificate, and installing the first entity certificate in the first storage medium associated with the first entity.

58. The method of claim 25,
wherein the first certificate chain comprises one or more signature-key pairs, wherein each signature-key pair of the one or more signature-key pairs respectively comprises a public key and a digital signature, and wherein validating the first certificate chain comprises, for each signature-key pair of the one or more signature-key pairs:
  computing a decryption hash value at least by decrypting the digital signature of the signature-key pair with the public key of the signature-key pair;
  computing a signature hash value at least by applying a hash function to the digital signature of the signature-key pair;
  comparing the decryption hash value to the signature hash value;
  determining a match between the decryption hash value and the signature hash value; and
  designating the first certificate chain as valid based at least in part on having determined the match between the decryption hash value and the signature hash value for each signature-key pair of the one or more signature-key pairs.

59. The method of claim 58, wherein the one or more signature-key pairs comprises:
  an intermediate signature-key pair comprising an intermediate public key and an intermediate digital signature of an intermediate CA, the intermediate public key corresponding to an intermediate CA certificate, and the first entity certificate including the intermediate digital signature of the intermediate CA; and
  a root signature-key pair comprising a root public key and a root digital signature of a root CA, the root public key corresponding to the first CA certificate, and the intermediate CA certificate including the root digital signature of the root CA.

60. The method of claim 58, wherein the one or more signature-key pairs comprises:
  a root signature-key pair comprising a root public key and a root digital signature of a root CA, the root public key corresponding to the first CA certificate, and the first entity certificate including the root digital signature of the root CA.

61. The method of claim 25, further comprising:
  receiving, at a second entity associated with the virtual cloud network, a second certificate bundle comprising a second updated set of CA certificates;
  determining that a second certificate chain is invalid, wherein the second certificate chain comprises a second entity certificate, having been issued to the second entity, and at least one second CA certificate of the second updated set of CA certificates;
  responsive to determining that the second certificate chain is invalid, rejecting the second certificate bundle, and utilizing an earlier certificate bundle to authenticate at least one additional entity associated with the virtual cloud network.

62. The method of claim 25, further comprising:
  subsequent to validating the first certificate chain, receiving, at the first entity, a first certificate bundle request from an overlay entity associated with the virtual cloud network, the virtual cloud network comprising a substrate network and an overlay network, wherein the overlay entity resides on the overlay network, and wherein the first entity comprises an interface entity that provides a communication interface between the substrate network and the overlay entity;
  responsive to the first certificate bundle request, transmitting from the interface entity to the overlay entity, the first certificate bundle comprising the first updated set of CA certificates;
  validating, by the overlay entity, a second certificate chain, wherein the second certificate chain comprises a first instance principal certificate, having been issued to the overlay entity, and a second CA certificate of the first updated set of CA certificates;
  responsive to validating the second certificate chain, installing the first certificate bundle in a second storage medium associated with the overlay entity, and utilizing, by the overlay entity, the first certificate bundle to authenticate at least one additional entity associated with the virtual cloud network.

63. The method of claim 62, further comprising:
  subsequent to validating the second certificate chain, receiving, at the overlay entity, a second instance principal certificate issued to the overlay entity, and installing the second instance principal certificate in the second storage medium associated with the overlay entity;
  receiving, at the first entity, a second certificate bundle request from the overlay entity;
  responsive to the second certificate bundle request, transmitting from the interface entity to the overlay entity, a second certificate bundle comprising a second updated set of CA certificates, the second updated set of CA certificates reflecting an update from the first updated set of CA certificates, wherein the update comprises removing the first certificate;
  validating a third certificate chain, wherein the third certificate chain comprises the second instance principal certificate, and a third CA certificate of the second updated set of CA certificates;
  responsive to validating the third certificate chain, installing the second certificate bundle in the second storage medium associated with the overlay entity, and utilizing the second certificate bundle to authenticate at least one additional entity associated with the virtual cloud network.

64. The method of claim 63, further comprising:
  subsequent to validating the third certificate chain, uninstalling the first instance principal certificate from the second storage medium associated with the overlay entity.

65. The method of claim 63, further comprising at least one of:
  the first entity utilizing the second certificate bundle to authenticate the overlay entity; or
  the overlay entity utilizing the second certificate bundle to authenticate the first entity.

66. The method of claim 25, further comprising:
  receiving, at a substrate entity associated with the virtual cloud network, the first certificate bundle comprising the first updated set of CA certificates;
  validating, by the substrate entity, a second certificate chain, wherein the second certificate chain comprises a first service principal certificate, having been issued to the substrate entity, and a second CA certificate of the first updated set of CA certificates;
  responsive to validating the second certificate chain, installing the first certificate bundle in a second storage medium associated with the substrate entity, and utilizing, by the substrate entity, the first certificate bundle to authenticate at least one additional entity associated with the virtual cloud network.

67. The method of claim 66, further comprising:
subsequent to validating the second certificate chain, receiving, at the substrate entity, a second service principal certificate issued to the substrate entity, and installing the second service principal certificate in the second storage medium associated with the substrate entity;
receiving, at the substrate entity, a second certificate bundle comprising a second updated set of CA certificates, the second updated set of CA certificates reflecting an update from the first updated set of CA certificates, wherein the update comprises removing the second CA certificate;
validating a third certificate chain, wherein the third certificate chain comprises the second service principal certificate, and a third CA certificate of the second updated set of CA certificates;
responsive to validating the third certificate chain, installing the second certificate bundle in the second storage medium associated with the substrate entity, and utilizing the second certificate bundle to authenticate at least one additional entity associated with the virtual cloud network.

68. The method of claim 67, further comprising:
subsequent to validating the third certificate chain, uninstalling the first service principal certificate from the second storage medium associated with the substrate entity.

69. The method of claim 67, further comprising at least one of:
the first entity utilizing the second certificate bundle to authenticate the substrate entity; or
the substrate entity utilizing the second certificate bundle to authenticate the first entity.

70. The method of claim 25, wherein the first updated set of CA certificates further comprises a second CA certificate, wherein the first CA certificate is a prior CA certificate and the second CA certificate is a subsequent CA certificate.

71. The method of claim 70, wherein the first CA certificate is issued by a first CA certificate authority, and the second CA certificate is issued by a second CA certificate authority.

72. The method of claim 25, wherein the first entity comprises one of: a substrate entity, an overlay entity, or an interface entity.

* * * * *